United States Patent
Nakahori

(10) Patent No.: US 8,072,785 B2
(45) Date of Patent: Dec. 6, 2011

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 572 days.

(21) Appl. No.: 12/318,416

(22) Filed: Dec. 29, 2008

(65) Prior Publication Data

US 2009/0168461 A1 Jul. 2, 2009

(30) Foreign Application Priority Data

Dec. 27, 2007 (JP) ................................. 2007-335847
Sep. 25, 2008 (JP) ................................. 2008-246500

(51) Int. Cl.
*H02J 1/10* (2006.01)
(52) U.S. Cl. ........................................... 363/65; 363/17
(58) Field of Classification Search .................... 363/17, 363/65, 69, 70, 71, 98; 323/250, 251
See application file for complete search history.

(56) References Cited

U.S. PATENT DOCUMENTS

| | | | |
|---|---|---|---|
| 6,362,986 B1 | 3/2002 | Schultz et al. | |
| 6,952,353 B2 | 10/2005 | Yan et al. | |
| 7,016,203 B2 | 3/2006 | Xu et al. | |
| 7,136,293 B2 | 11/2006 | Petkov et al. | |
| 7,239,530 B1 | 7/2007 | Djekic et al. | |
| 2006/0145800 A1 | 7/2006 | Dadafshar et al. | |
| 2006/0197510 A1 | 9/2006 | Chandrasekaran | |
| 2007/0097571 A1 | 5/2007 | Dinh et al. | |
| 2009/0079402 A1* | 3/2009 | Nakahori | 323/255 |
| 2009/0109709 A1* | 4/2009 | Nakahori | 363/16 |

FOREIGN PATENT DOCUMENTS

| | | |
|---|---|---|
| JP | A-08-181024 | 7/1996 |
| JP | A-2000-260639 | 9/2000 |
| JP | A-2004-022613 | 1/2004 |

\* cited by examiner

*Primary Examiner* — Harry Behm
*Assistant Examiner* — Matthew Grubb
(74) *Attorney, Agent, or Firm* — Oliff & Berridge, PLC

(57) ABSTRACT

A switching power supply unit is provided, which may supply stable output while manufacturing cost is held down. In a smoothing circuit, a magnetic flux in a first circular magnetic path, a magnetic flux in a second circular magnetic path, a magnetic flux generated by a current flowing through a choke coil, and a magnetic flux generated by a current flowing through another choke coil are shared by one another in the inside of a common magnetic core. A current flowing through two choke coils and a current flowing through different, two choke coils are balanced, and thus stabilized. Moreover, in the smoothing circuit, since such a balanced state is automatically kept, a characteristic value of an element or the like need not be adjusted.

7 Claims, 16 Drawing Sheets

SWITCHING POWER SUPPLY UNIT

CROSS REFERENCE TO RELATED APPLICATIONS

The present invention contains subject matter related to Japanese Patent Applications JP 2007-335847 on Dec. 27, 2007 and JP 2008-246500 filed on Sep. 25, 2008 in the Japanese Patent Office, the entire contents of which being incorporated herein by reference.

BACKGROUND OF THE INVENTION

1. Field of the Invention

The present invention relates to a switching power supply unit configured to produce switching output, the switching output being obtained by switching a DC input voltage, at an output winding of a power conversion transformer.

2. Background Art

Various types of DC/DC converters have been proposed for a switching power supply unit, and provided for practical use in the past. Most of the DC/DC converters are in a type where a DC input voltage is switched by switching operation of a switching circuit connected to a primary winding of a power conversion transformer (transformer), and the switching output is produced at a secondary winging of the power conversion transformer. A voltage induced in the secondary winging with switching operation of the switching circuit is rectified by a rectifier circuit, then converted into a DC voltage by a smoothing circuit, and then outputted.

In such a switching power supply unit, when a plurality of rectifier circuits are used for the purpose of controlling voltage drop in a rectifier circuit or a smoothing circuit to be small in order to handle a large current, a smoothing circuit using an LC circuit needs to be used to balance currents flowing from the respective rectifier circuits so as to stabilize output. Thus, for example, U.S. Pat. No. 6,362,986 proposes a switching power supply unit, in which an inductor having two magnetic cores is used, so that magnetic fluxes generated by currents flowing from the respective rectifier circuits are balanced.

SUMMARY OF THE INVENTION

However, in the method according to U.S. Pat. No. 6,362,986, while magnetic fluxes are balanced in some degree, a characteristic value of an element or the like has been necessary to be adjusted or selected to attain the purpose, or an element having a large allowance of a characteristic value or the like has been necessary to be used. Therefore, there has been a difficulty that flexibility in design is reduced, and manufacturing cost is increased.

In view of forgoing, it is desirable to provide a switching power supply unit that may supply stable output while manufacturing cost is held down.

A first switching power supply unit of an embodiment of the invention includes an inverter switching a DC input voltage to generate an AC voltage; one or more transformers, each having a primary winding on a side of the inverter and secondary windings, and transforming the AC voltage and outputting an AC output voltage; a pair of rectifier circuits each connected to secondary sides of each of the transformers, each of the rectifier circuits rectifying the AC output voltage; and a smoothing circuit smoothing output voltages from the pair of rectifier circuits so as to generate a DC output voltage. The smoothing circuit includes a capacitance element; first and second magnetic cores; a common magnetic core disposed between the first and second magnetic cores; first and second windings, each winding being connected to one of the rectifier circuits at one end, and wound on the first magnetic core; third and fourth windings, each winding being connected to one of the rectifier circuits at one end, and wound on the second magnetic core; a first common winding connecting between one end of the capacitance element and a connection point of the other ends of the first and third windings, and wound on the common magnetic core; and a second common winding connecting between the other end of the capacitance element and a connection point of the other ends of the second and fourth windings, and wound on the common magnetic core. A current through the first winding and a current through the second winding generate a first circular magnetic path passing through the inside of the first magnetic core and the common magnetic core; a current through the third winding and a current through the fourth winding, which are synchronized with the current through the first winding and the current through the second winding, generate a second circular magnetic path passing through the inside of the second magnetic core and the common magnetic core; and the common magnetic core is shared by a magnetic flux in the first circular magnetic path, a magnetic flux in the second circular magnetic path, a magnetic flux generated by the current through the first common winding, and a magnetic flux generated by the current through the second common winding. The phrase "in synchronization with" does not limitedly refer to a literally perfectly synchronized case, and means a substantially synchronized state.

In the first switching power supply unit of an embodiment of the invention, a DC input voltage is switched by the inverter circuits so that input AC voltages are generated, and the input AC voltages are transformed by the transformers, and the AC output voltages are outputted to the secondary sides respectively. The two rectifier circuits perform rectification operation of the AC output voltages respectively, and the smoothing circuit smoothes the output voltages from the two rectifier circuits so as to generate a DC output voltage. In the smoothing circuit, the first to fourth windings and the first and second common windings are appropriately wound on the first and second magnetic cores and the common magnetic core respectively, thereby the current flowing through the first winding and the current flowing through the second winding form the first circular magnetic path passing through the inside of the first magnetic core and the inside of the common magnetic core, and a current flows through the third and fourth windings in synchronization with the current flowing through the first winding and the current flowing through the second winding, and the current flowing through the third winding and the current flowing through the fourth winding form the second circular magnetic path passing through the inside of the second magnetic core and the inside of the common magnetic core. The magnetic flux in the first circular magnetic path, the magnetic flux in the second circular magnetic path, the magnetic flux generated by the current flowing through the first common winding, and the magnetic flux generated by the current flowing through the second common winding are the same in direction, and shared by one another in the inside of the common magnetic core. Thus, a current flowing through the first and second windings and a current flowing through the third and fourth windings are balanced, and thus stabilized. Moreover, since such a balanced state is automatically kept, a characteristic value of an element or the like need not be adjusted.

The first switching power supply unit of an embodiment of the invention may be configured such that the pair of rectifier circuits include first and second rectifier circuits, each having a current inlet and a current outlet, one end of the first winding is connected to the current outlet of the first rectifier circuit, one end of the second winding is connected to the current inlet of the first rectifier circuit, one end of the third winding is connected to the current outlet of the second rectifier circuit, and one end of the fourth winding is connected to the current inlet of the second rectifier circuit.

The first switching power supply unit of an embodiment of the invention may be configured such that the pair of rectifier circuits include first and second rectifier circuits, each having a current inlet and a current outlet, one end of the first winding is connected to the current outlet of the second rectifier circuit, one end of the second winding is connected to the current inlet of the first rectifier circuit, one end of the third winding is connected to the current outlet of the first rectifier circuit, and one end of the fourth winding is connected to the current inlet of the second rectifier circuit.

The first switching power supply unit of an embodiment of the invention may be configured such that the transformers include first and second transformers having a pair of secondary windings; the pair of rectifier circuits include a first rectifier circuit and a second rectifier circuit each having a current inlet and a current outlet, one of the pair of the secondary windings of the first transformer being connected to the first rectifier circuit while the other being connected to the second rectifier circuit, and one of the secondary windings of the second transformer being connected to the second rectifier circuit while the other being connected to the first rectifier circuit; one end of the first winding in the smoothing circuit is connected to the current outlet of the first rectifier circuit; one end of the second winding in the smoothing circuit is connected to the current inlet of the first rectifier circuit; one end of the third winding in the smoothing circuit is connected to the current outlet of the second rectifier circuit; and one end of the fourth winding in the smoothing circuit is connected to the current inlet of the second rectifier circuit.

In the first switching power supply unit of an embodiment of the invention, each of the transformers preferably has a pair of primary windings being connected in series, AC resistance of the pair of primary windings alternately changing higher in accordance with change of current direction during switching operation of the inverter. In the case of such a configuration, when currents flow through the primary winding of the transformer and through the secondary winding thereof in opposite directions between the primary and secondary windings, AC resistance is decreased due to a skin effect and a proximity effect. Therefore, since an oscillating component is absorbed by a primary winding having relatively high AC resistance, ringing of output is suppressed.

In the first switching power supply unit of an embodiment of the invention, the inverter preferably includes a single inverter circuit. In the case of such a configuration, compared with a case that the inverter circuit includes a plurality of inverter circuits, a circuit configuration is simplified, and manufacturing cost is held down.

A second switching power supply unit of an embodiment of the invention, converting a DC input voltage inputted from one of first and second input/output terminal pairs to a DC output voltage, and outputting the DC output voltage from the other of input/output terminal pairs, includes one or more transformers, each having a first transformer winding on a side of the first input/output terminal pair, and second transformer windings on a side of the second input/output terminal pair; a first circuit disposed on a side of the first transformer winding of the transformers, the first circuit including a plurality of first switching elements and first rectifier elements, each of the first rectifier elements being connected in parallel to each of the plurality of first switching elements; a pair of second circuits each disposed on a side of the second transformer windings of the transformers, each of the second circuits including a plurality of second switching elements and second rectifier elements, each of the second rectifier elements being connected in parallel to each of the plurality of second switching elements; and a smoothing circuit disposed between the second input/output terminal and the pair of second circuits. The smoothing circuit includes a capacitance element; first and second magnetic cores; a common magnetic core disposed between the first and second magnetic cores; first and second windings, each winding being connected to the second circuit at one end, and wound on the first magnetic core; third and fourth windings, each winding being connected to one of the second circuits at one end, and wound on the second magnetic core; a first common winding connecting between one end of the capacitance element and a connection point of the other ends of the first and third windings, and wound on the common magnetic core; and a second common winding connecting between the other end of the capacitance element and a connection point of the other ends of the second and fourth windings, and wound on the common magnetic core. A current through the first winding and a current through the second winding generate a first circular magnetic path passing through the inside of the first magnetic core and the common magnetic core; a current through the third winding and a current through the fourth winding, which are synchronized with the current through the first winding and the current through the second winding, generate a second circular magnetic path passing through the inside of the second magnetic core and the common magnetic core; and the common magnetic core is shared by a magnetic flux in the first circular magnetic path, a magnetic flux in the second circular magnetic path, a magnetic flux generated by the current through the first common winding, and a magnetic flux generated by the current through the second common winding.

In the second switching power supply unit of an embodiment of the invention, during forward operation, a DC input voltage is inputted from the first input/output terminal pair, and an input AC voltage is generated by the first switching elements in each of the first circuits operating as inverter circuits. When the input AC voltage is inputted into the first transformer winding side of each of the transformers, the AC voltage is transformed, and an AC output voltage is outputted from the second transformer winding side. The AC output voltage is rectified by a second rectifier element in each of the two second circuits operating as rectifier circuits, and each of output voltages from the two second circuits is smoothed by the smoothing circuit, thereby a DC output voltage is outputted from the second input/output terminal pair. On the other hand, during reverse operation, a DC input voltage is inputted via the smoothing circuit from the second input/output terminal pair, and AC voltages are generated by the second switching elements in the two second circuits, each operating as an inverter circuit. When each of the input AC voltages is inputted into the second transformer winding side of each transformer, the AC voltage is transformed, and an AC output voltage is outputted from the first transformer winding side. The AC output voltage is rectified by first rectifier elements in each of the first circuits operating as rectifier circuits, and a DC output voltage is outputted from the first input/output terminal pair. In the smoothing circuit, the first to fourth windings and the first and second common windings are appropriately wound on the first and second magnetic cores and on the common magnetic core respectively, thereby the current flowing through the first winding and the current flowing through the second winding form the first circular magnetic path passing through the inside of the first magnetic core and the inside of the common magnetic core; a current flows through the third and fourth windings in synchronization with the current flowing through the first winding and the current flowing through the second winding, and the current flowing through the third winding and the current flowing through the fourth winding form the second circular magnetic path passing through the inside of the second magnetic core and the inside of the common magnetic core. The magnetic flux in the first circular magnetic path, the magnetic flux in the second circular magnetic path, the magnetic flux generated by the current flowing through the first common winding, and the magnetic flux generated by the current flowing through the second common winding are the same in direction, and shared by one another in the inside of the common magnetic core. Thus, a current flowing through the first and second windings and a current flowing through the third and fourth windings are balanced, and thus stabilized. Moreover, since such a balanced state is automatically kept, a characteristic value of an element or the like need not be adjusted.

According to the switching power supply unit of an embodiment of the invention, in the smoothing circuit, the first circular magnetic path passing through the inside of the first magnetic core and the inside of the common magnetic core is formed, and the second circular magnetic path passing through the inside of the second magnetic core and the inside of the common magnetic core is formed; and the magnetic flux in the first circular magnetic path, the magnetic flux in the second circular magnetic path, the magnetic flux generated by the current flowing through the first common winding, and the magnetic flux generated by the current flowing through the second common winding are the same in direction, and shared by one another in the inside of the common magnetic core; therefore a current flowing through the first and second windings and a current flowing through the third and fourth windings can be balanced, and thus stabilized. Moreover, since such a balanced state is automatically kept, a characteristic value of an element or the like need not be adjusted, so that the characteristic value of an element or the like need not have a large allowance. Consequently, stable output can be supplied while manufacturing cost is held down.

Other and further objects, features and advantages of the invention will appear more fully from the following description.

DETAILED DESCRIPTION OF THE PREFERRED EMBODIMENTS

Hereinafter, the best mode for carrying out the invention (hereinafter, simply called embodiment) will be described in detail with reference to drawings.

Figure 1:
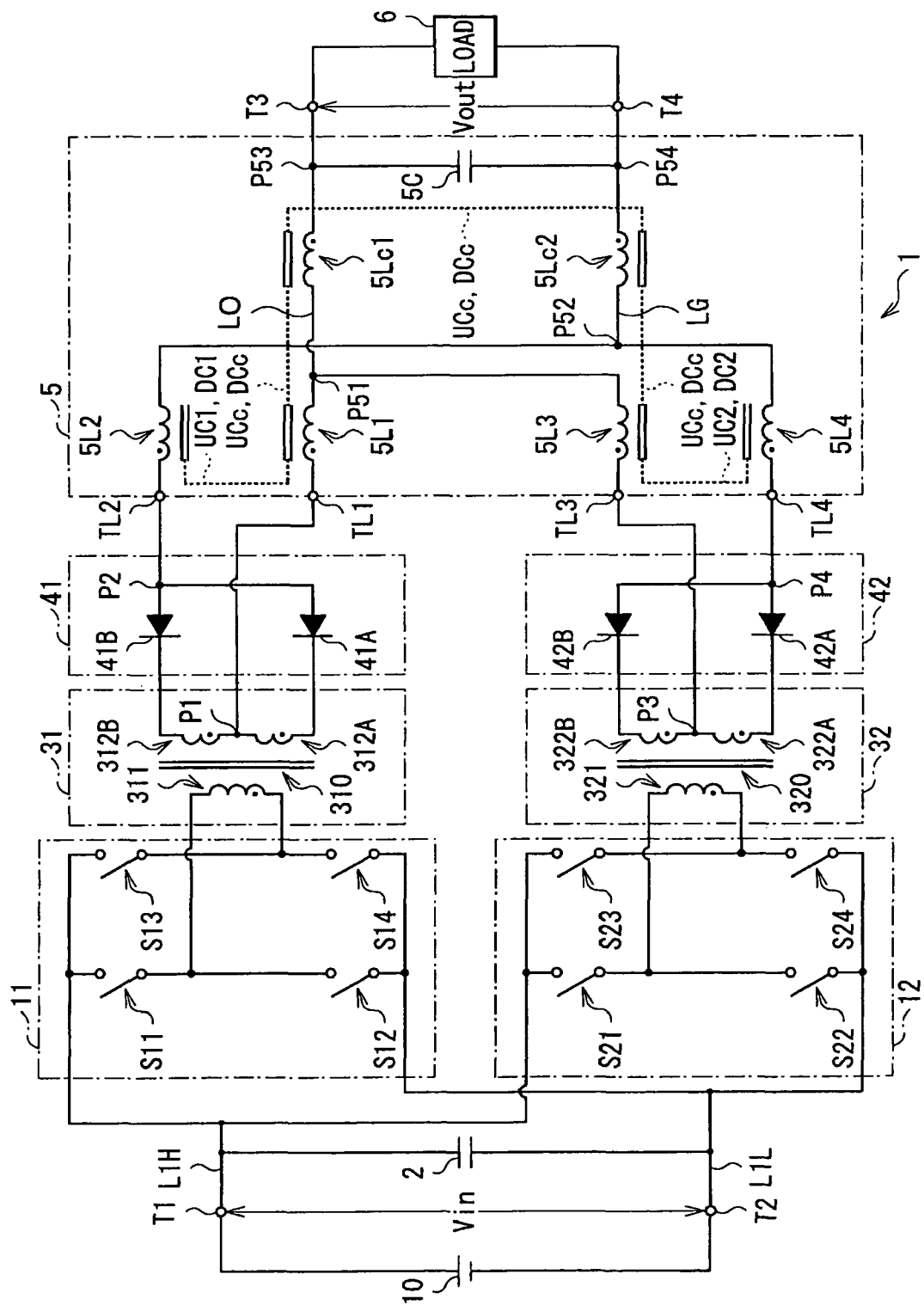
FIG. 1 shows a circuit diagram showing a configuration of a switching power supply unit according to an embodiment of the invention.

FIG. 1 shows a circuit configuration of a switching power supply unit (switching power supply unit 1) according to an embodiment of the invention. The switching power supply unit 1 operates as a DC/DC converter that converts a high DC input voltage Vin supplied from a high-voltage battery 10 into a relatively low DC output voltage Vout, and supplies the output voltage to a not-shown low-voltage battery to drive a load 6.

The switching power supply unit 1 has an input smoothing capacitor 2 provided between a primary high-voltage line L1H and a primary low-voltage line L1L, inverter circuits 11 and 12 provided between the primary high-voltage line L1H and the primary low-voltage line L1L, a transformer 31 having a primary winding 311 and secondary windings 312A and 312B, and a transformer 32 having a primary winding 321 and secondary windings 322A and 322B. The DC input voltage Vin outputted from the high-voltage battery 10 is applied between an input terminal T1 of the primary high-voltage line L1H and an input terminal T2 of the primary low-voltage line L1L. The switching power supply unit 1 further has two rectifier circuits, namely, a rectifier circuit 41 provided at a secondary side of the transformer 31 and a rectifier circuit 42 provided at a secondary side of the transformer 32, and a smoothing circuit 5 connected to the rectifier circuits 41 and 42.

The input smoothing capacitor 2 smoothes the DC input voltage Vin inputted from the input terminals T1 and T2.

The inverter circuit 11 has a circuit configuration of a full bridge type including four switching elements S11 to S14. Specifically, respective one ends of the switching elements S11 and S12 are connected to each other, and respective one ends of the switching elements S13 and S14 are connected to each other, and these one ends are connected to each other via the primary winding 311 of the transformer 31. In addition, the other ends of the switching elements S11 and S13 are connected to each other, and the other ends of the switching elements S12 and S14 are connected to each other, and these other ends are connected to the input terminals T1 and T2 respectively. According to such a configuration, the inverter circuit 11 converts a DC input voltage Vin applied between the input terminals T1 and T2 into an input AC voltage according to a drive signal supplied from a not-shown drive circuit.

Similarly, the inverter circuit 12 has a circuit configuration of a full bridge type including four switching elements S21 to S24. Specifically, respective one ends of the switching elements S21 and S22 are connected to each other, and respective one ends of the switching elements S23 and S24 are connected to each other, and these one ends are connected to each other via the primary winding 321 of the transformer 32. In addition, the other ends of the switching elements S21 and S23 are connected to each other, and the other ends of the switching elements S22 and S24 are connected to each other, and these other ends are connected to the input terminals T1 and T2 respectively. According to such a configuration, the inverter circuit 12 also converts a DC input voltage Vin applied between the input terminals T1 and T2 into an input AC voltage according to a drive signal supplied from the not-shown drive circuit.

As the switching elements S11 to S14 and S21 to S24, for example, a switch element such as Metal Oxide Semiconductor-Field Effect Transistor (MOS-FET) or IGBT (Insulated Gate Bipolar Transistor) is used.

Respective one ends of a pair of secondary windings 312A and 312B of the transformer 31 are connected to each other at a center tap P1, and a wiring from the center tap P1 is guided to a terminal TL1 of the smoothing circuit 5. The transformer 31 transforms an input AC voltage generated by the inverter circuit 11, and outputs AC output voltages, being different in phase by 180 degrees, from respective ends of the pair of secondary windings 312A and 312B (ends at a side opposite to the center tap P1). In this case, a transformation level is determined by a winding ratio between the primary winding 311 and the secondary windings 312A and 312B.

Respective one ends of a pair of secondary windings 322A and 322B of the transformer 32 are connected to each other at a center tap P3, and a wiring from the center tap P3 is guided to a terminal TL3 of the smoothing circuit 5. The transformer 32 transforms an input AC voltage generated by the inverter circuit 12, and outputs AC output voltages, being different in phase by 180 degrees, from respective ends of the pair of secondary windings 322A and 322B (ends at a side opposite to the center tap P3). In this case, a transformation level is determined by a winding ratio between the primary winding 321 and the secondary windings 322A and 322B.

The rectifier circuit 41 is a circuit of a single-phase full-wave rectification type including a pair of rectifier diodes 41A and 41B. A cathode of the rectifier diode 41A is connected to the other end of the secondary winding 312A of the transformer 31, and a cathode of the rectifier diode 41B is connected to the other end of the secondary winding 312B of the transformer 31. Anodes of the rectifier diodes 41A and 41B are connected to each other at a connection point P2, and guided to a terminal TL2 of the smoothing circuit 5. That is, the rectifier circuit 41 has an anode-common connection configuration of a center tap type, wherein each half-wave period of the AC output voltage from the transformer 31 is individually rectified by the rectifier diodes 41A and 41B so as to obtain a DC voltage.

Similarly, the rectifier circuit 42 is a circuit of a single-phase full-wave rectification type including a pair of rectifier diodes 42A and 42B. A cathode of the rectifier diode 42A is connected to the other end of the secondary winding 322A of the transformer 32, and a cathode of the rectifier diode 42B is connected to the other end of the secondary winding 322B of the transformer 32. Anodes of the rectifier diodes 42A and 42B are connected to each other at a connection point P4, and guided to a terminal TL4 of the smoothing circuit 5. That is, the rectifier circuit 42 also has an anode-common connection configuration of a center tap type, wherein each half-wave period of the AC output voltage from the transformer 32 is individually rectified by the rectifier diodes 42A and 42B so as to obtain a DC voltage.

The smoothing circuit 5 is configured of a core member (not shown) described later, choke coils 5L1 to 5L4, 5Lc1 and 5Lc2, and an output smoothing capacitor 5C. The choke coil 5L1 is disposed on an output line LO (a line connecting between a connection point P51 and an output terminal T3, and supplying an output current to the load 6) in an insertional manner, and connected to the terminal TL1 at one end, and connected to the connection point P51 at the other end. The choke coil 5L2 is disposed on a ground line LG (a line connecting between a connection point P52 and an output terminal T4) in an insertional manner, and connected to the terminal TL2 at one end, and connected to the connection point P52 at the other end. The choke coil 5L3 is disposed on the output line LO in an insertional manner, and connected to the terminal TL3 at one end, and connected to the connection point P51 at the other end. The choke coil 5L4 is disposed on the ground line LG in an insertional manner, and connected to the terminal TL4 at one end, and connected to the connection point P52 at the other end. The choke coil 5Lc1 is disposed on the output line LO in an insertional manner, and connected to the connection point P51 at one end, and connected to a connection point P53 (one and of the output smoothing capacitor 5C) at the other end. The choke coil 5Lc2 is disposed on the ground line LG in an insertional manner, and connected to the connection point P52 at one end, and connected to a connection point P54 (the other end of the output smoothing capacitor 5C) at the other end. The choke coil 5L1 and the choke coil 5L2 are magnetically coupled with each other by first magnetic cores UC1 and DC1 (described in detail later) of the core member, and the choke coil 5L3 and the choke coil 5L4 are magnetically coupled with each other by second magnetic cores UC2 and DC2 (described in detail later) of the core member. The choke coils 5L1, 5Lc1, 5Lc2 and 5L3 are magnetically coupled with one another by common magnetic cores (center cores) UCc and DCc (described in detail later) of the core member. The output smoothing capacitor 5C is connected between the output line LO (specifically, the connection point P53) and the ground line LG (specifically, the connection point P54). The output terminal T3 is provided at an end of the output line LO, and the output terminal T4 is provided at an end of the ground line LG. According to such a configuration, the smoothing circuit 5 smoothes the DC voltages rectified by the rectifier circuits 41 and 42 to generate a DC output voltage Vout, and supplies the voltage Vout to the low-voltage battery (not shown) from the output terminals T3 and T4.

Figure 2:
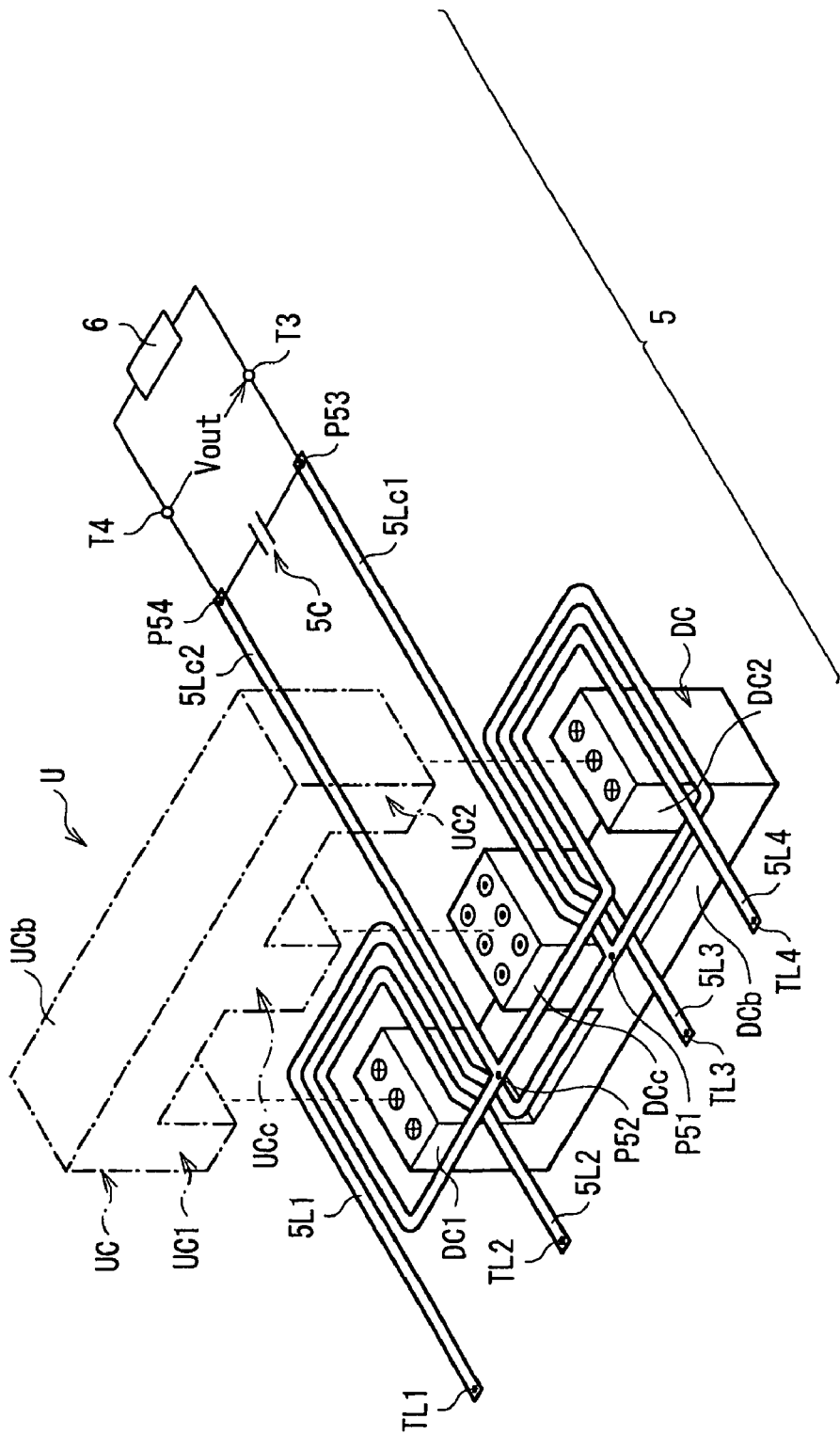
FIG. 2 shows a perspective view showing an outside configuration of a smoothing circuit shown in FIG. 1.

Next, a detailed configuration of the rectifier circuit 5, being a main characteristic portion of an embodiment of the invention, is described with reference to FIG. 2. FIG. 2 shows a perspective view showing an outside configuration of the rectifier circuit 5.

The smoothing circuit 5 has a structure where the choke coils 5L1 to 5L4, 5Lc1 and 5Lc2 are wound around a core member U being an E-E core including an upper E core UC and a lower E core DC opposed to each other. The upper E core UC and the lower E core DC include a magnetic material such as ferrite respectively, and the choke coils 5L1 to 5L4, 5Lc1 and 5Lc2 include a conductive material such as copper or aluminum respectively.

The upper E core UC is configured of a base core UCb, and three leg portions extending from the base core UCb including a first magnetic core UC1, a second magnetic core UC2, and a common magnetic core (center core) UCc. The lower E core UC is configured of a base core DCb, and three leg portions extending from the base core DCb including a first magnetic core DC1, a second magnetic core DC2, and a common magnetic core (center core) DCc. A predetermined gap may be provided between the common magnetic cores UCc and DCc, between the first magnetic cores UC1 and DC1, or between the second magnetic cores UC2 and DC2. Specifically, the predetermined gap may be exclusively provided between the common magnetic cores UCc and DCc, or may be exclusively provided between the first magnetic cores UC1 and DC1, and between the second magnetic cores UC2 and DC2. Alternatively, the predetermined gap may be provided between the common magnetic cores UCc and DCc, between the first magnetic cores UC1 and DC1, and between the second magnetic cores UC2 and DC2 respectively. A perfectly equivalent gap is hardly provided between both outer legs (the first magnetic cores UC1 and DC1 and the second magnetic cores UC2 and DC2) by which a magnetic flux is shunted. However, since a magnetic flux commonly flows through the center magnetic cores (common magnetic cores UCc and DCc), a perfectly equivalent gap for both loops can be formed between the center magnetic cores.

The choke coil 5L1 is connected to the terminal TL1 at one end, and wound by one turn clockwise in view from a top of the figure on the first magnetic cores UC1 and DC1 and thus connected to the connection point P51 at the other end. The choke coil 5L2 is connected to the terminal TL2 at one end, and wound by one turn counterclockwise in view from a top of the figure on the first magnetic cores UC1 and DC1 and thus connected to the connection point P52 at the other end. The choke coil 5L3 is connected to the terminal TL3 at one end, and wound by one turn clockwise in view from a top of the figure on the second magnetic cores UC2 and DC2 and thus connected to the connection point P51 at the other end. The choke coil 5L4 is connected to the terminal TL4 at one end, and wound by one turn counterclockwise in view from a top of the figure on the second magnetic cores UC2 and DC2 and thus connected to the connection point P52 at the other end.

As shown in FIG. 1, one end of the choke coil 5L1 is connected to the connection point P1 (center tap) via the terminal TL1, one end of the choke coil 5L2 is connected to the connection point P2 via the terminal TL2, one end of the choke coil 5L3 is connected to the connection point P3 (center tap) via the terminal TL3, and one end of the choke coil 5L4 is connected to the connection point P4 via the terminal TL4.

Respective other ends of the choke coils 5L1 and 5L3 are connected to each other at the connection point P51, and connected to one end of the choke coil 5Lc1. The choke coil 5Lc1 is wound by 0.5 turns counterclockwise in view from a top of the figure on the common magnetic cores UCc and DCc (passes through a region near a right side face of each of the common magnetic cores UCc and DCc in view from a top of the figure), thereby connected at the other end to one end (connection point P53) of the output smoothing capacitor 5C. Respective other ends of the choke coils 5L2 and 5L4 are connected to each other at the connection point P52, and connected to one end of the choke coil 5Lc2. The choke coil 5Lc2 is wound by 0.5 turns clockwise in view from a top of the figure on the common magnetic cores UCc and DCc (passes through a region near a left side face of each of the common magnetic cores UCc and DCc in view from a top of the figure), thereby connected at the other end to the other end (connection point P54) of the output smoothing capacitor 5C.

While described in detail later, currents flowing through the choke coils 5L1 to 5L4 and the choke coils 5Lc1 and 5Lc2 form certain circular magnetic paths.

The output smoothing capacitor 5C corresponds to a specific example of "capacitance element" of an embodiment of the invention. The choke coil 5L1 corresponds to a specific example of "first winding" of an embodiment of the invention, the choke coil 5L2 corresponds to a specific example of "second winding" of an embodiment of the invention, the choke coil 5L3 corresponds to a specific example of "third winding" of an embodiment of the invention, and the choke coil 5L4 corresponds to a specific example of "fourth winding" of an embodiment of the invention. The choke coil 5Lc1 corresponds to a specific example of "first common winding" of an embodiment of the invention, and the choke coil 5Lc2 corresponds to a specific example of "second common winding" of an embodiment of the invention. The rectifier circuit 41 corresponds to a specific example of "first rectifier circuit" of an embodiment of the invention, and the rectifier circuit 42 corresponds to a specific example of "second rectifier circuit" of an embodiment of the invention. The connection point P1 (center tap) corresponds to a specific example of "current outlet of the first rectifier circuit" of an embodiment of the invention, the connection point P2 corresponds to a specific example of "current inlet of the first rectifier circuit" of an embodiment of the invention, the connection point P3 (center tap) corresponds to a specific example of "current outlet of the second rectifier circuit" of an embodiment of the invention, and the connection point P4 corresponds to a specific example of "current inlet of the second rectifier circuit" of an embodiment of the invention.

Next, a function of the switching power supply unit 1 of the embodiment is described with reference to FIGS. 3 to 5.

First, basic operation of the switching power supply unit 1 is described with reference to FIGS. 3 and 4.

In the switching power supply unit 1, the inverter circuit 11 switches a DC input voltage Vin supplied from the input terminals T1 and T2 so as to generate an input AC voltage, and the input AC voltage is supplied to the primary winding 311 of the transformer 31. The transformer 31 transforms the input AC voltage, and the transformed AC output voltage is outputted from the secondary windings 312A and 312B. Similarly, the inverter circuit 12 switches a DC input voltage Vin supplied from the input terminals T1 and T2 so as to generate an input AC voltage, and the input AC voltage is supplied to the primary winding 321 of the transformer 32. The transformer 32 transforms the input AC voltage, and the transformed AC output voltage is outputted from the secondary windings 322A and 322B.

In the rectifier circuit 41, the AC output voltage outputted from the transformer 31 is rectified by the rectifier diodes 41A and 41B. Thus, rectified output is generated between the center tap P1 and the connection point P2 between the rectifier diodes 41A and 41B. Similarly, in the rectifier circuit 42, the AC output voltage outputted from the transformer 32 is rectified by the rectifier diodes 42A and 42B. Thus, rectified output is generated between the center tap P3 and the connection point P4 between the rectifier diodes 42A and 42B.

In the smoothing circuit 5, the rectified output generated by each of the rectifier circuits 41 and 42 is smoothed by the choke coils 5L1 to 5L4, 5Lc1 and 5Lc2, and the output smoothing capacitor 5C, and thereby the DC output voltage Vout is outputted from the output terminals T3 and T4. The DC output voltage Vout is supplied to the not-shown low-voltage battery for charging the battery, and for driving the load 6.

In the switching power supply unit 1 of the embodiment, a period when the switching elements S11 and S14 and the switching elements S21 and S24 are on, and a period when the switching elements S12 an S13 and the switching elements S22 and S23 are on are alternately repeated. Thus, operation of the switching power supply unit 1 is described further in detail as follows.

Figure 3:
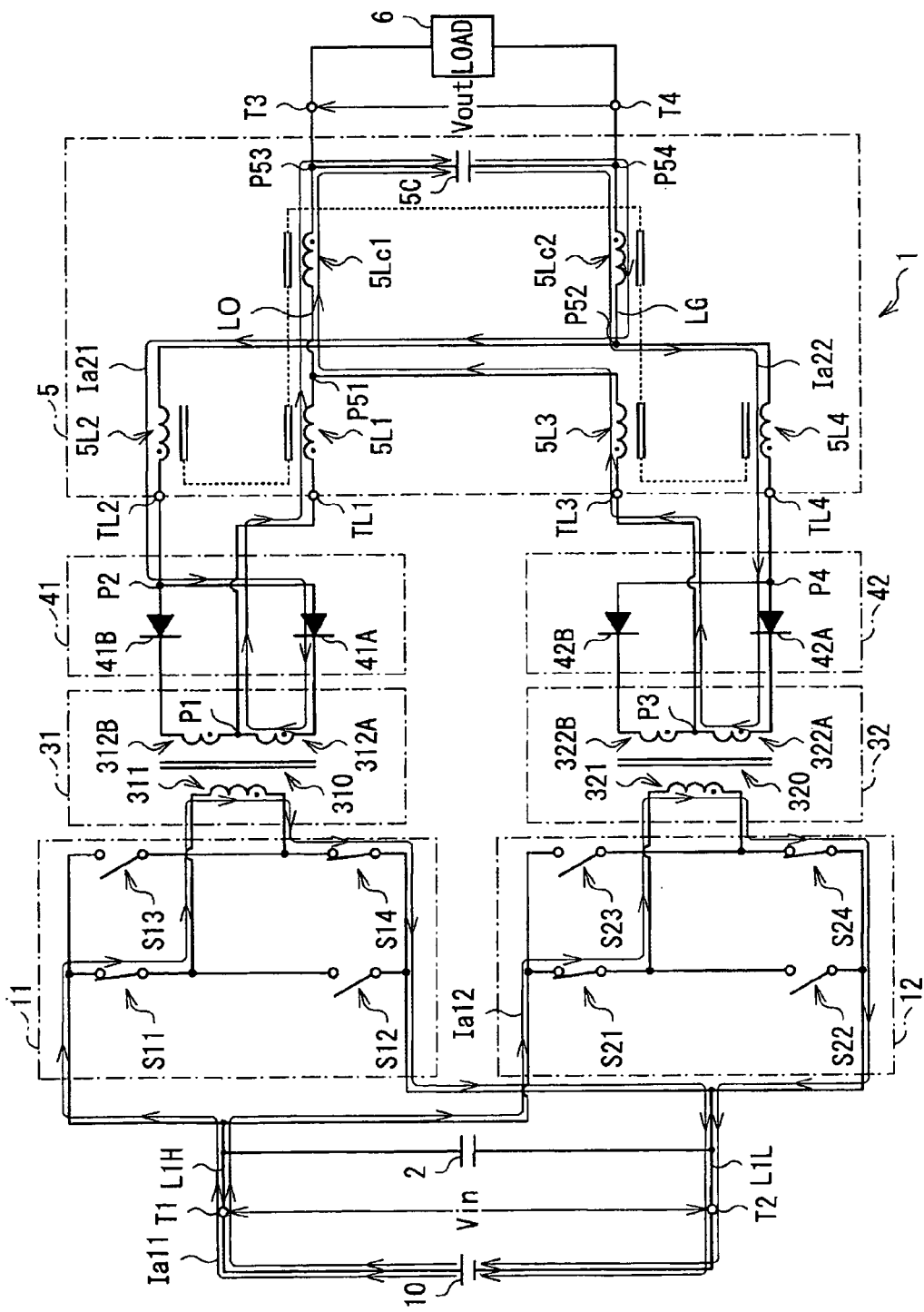
FIG. 3 shows a circuit diagram for illustrating basic operation of the switching power supply unit shown in FIG. 1.

First, as shown in FIG. 3, when the switching elements S11 and S14 of the inverter circuit 11 and the switching elements S21 and S24 of the inverter circuit 12 are turned on respectively, a primary loop current Ia11 flows in a direction from the switching element S11 to the switching element S14, and a primary loop current Ia12 flows in a direction from the switching element S21 to the switching element S24. Thus, each of voltages induced in the secondary windings 312A and 312B of the transformer 31 is in a reverse direction with respect to the rectifier diode 41B, but in a forward direction with respect to the rectifier diode 41A. Thus, a secondary loop current Ia21 flows through the rectifier diode 41A, the secondary winding 312A, the choke coils 5L1 and 5Lc1, the output smoothing capacitor 5C, and the choke coils 5Lc2 and 5L2 in order. Similarly, each of voltages induced in the secondary windings 322A and 322B of the transformer 32 is in a reverse direction with respect to the rectifier diode 42B, but in a forward direction with respect to the rectifier diode 42A. Thus, a secondary loop current Ia22 flows through the rectifier diode 42A, the secondary winding 322A, the choke coils 5L3 and 5Lc1, the output smoothing capacitor 5C, and the choke coils 5Lc2 and 5L4 in order. The secondary loop currents Ia21 and Ia22 flow, so that the DC output voltage Vout is supplied to the not-shown low-voltage battery, and the load 6 is driven.

Figure 4:
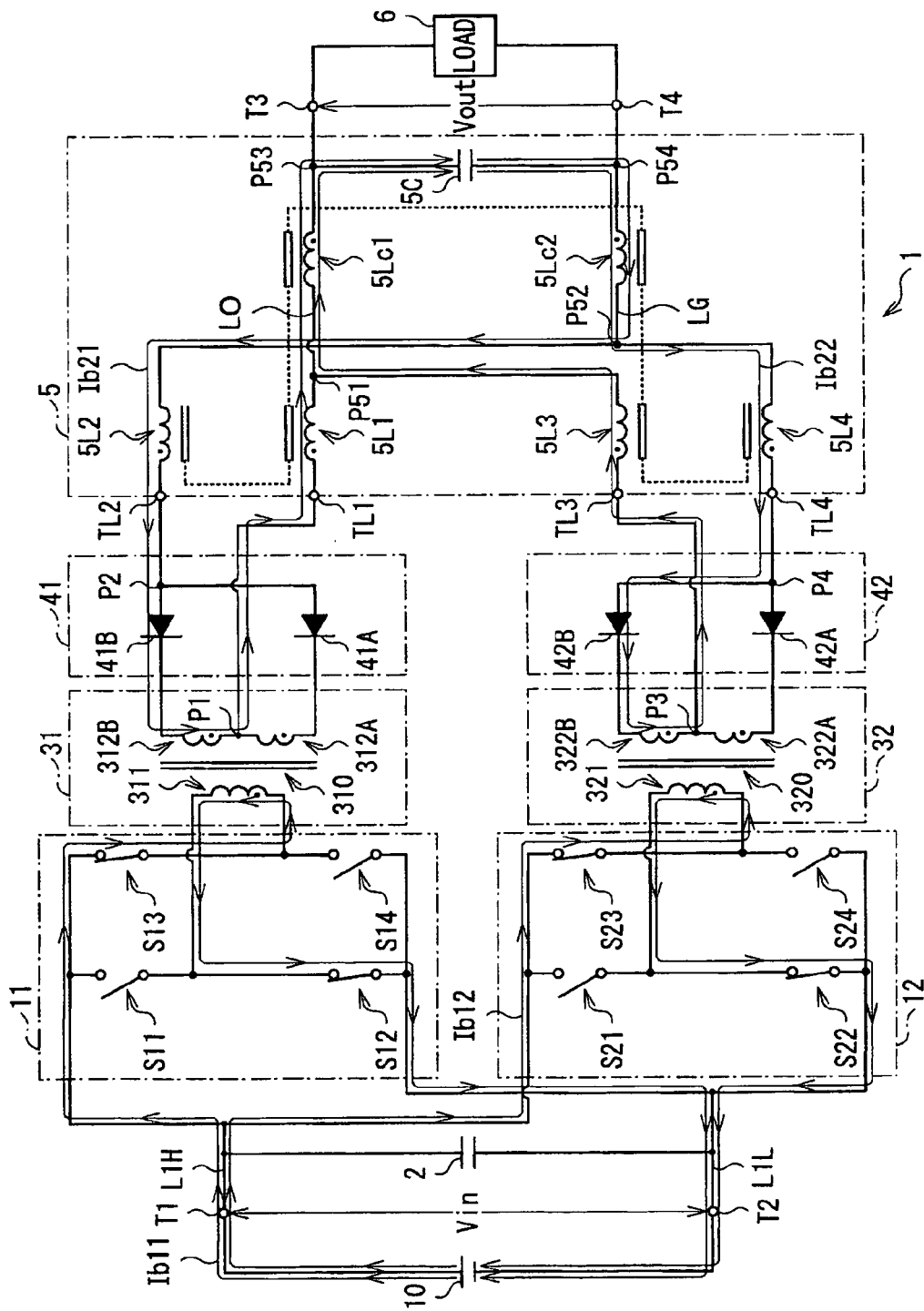
FIG. 4 shows a circuit diagram for illustrating the basic operation of the switching power supply unit shown in FIG. 1.

On the other hand, as shown in FIG. 4, when the switching elements S11 and S14 of the inverter circuit 11 and the switching elements S21 and S24 of the inverter circuit 12 are turned off respectively, and the switching elements S12 and S13 of the inverter circuit 11 and the switching elements S22 and S23 of the inverter circuit 12 are turned on respectively, a primary loop current Ib11 flows in a direction from the switching element S13 to the switching element S12, and a primary loop current Ib12 flows in a direction from the switching element S23 to the switching element S22. Thus, each of voltages induced in the secondary windings 312A and 312B of the transformer 31 is in a reverse direction with respect to the rectifier diode 41A, but in a forward direction with respect to the rectifier diode 41B. Thus, a secondary loop current Ib21 flows through the rectifier diode 41B, the secondary winding 312B, the choke coils 5L1 and 5Lc1, the output smoothing capacitor 5C, and the choke coils 5Lc2 and 5L2 in order. Similarly, each of voltages induced in the secondary windings 322A and 322B of the transformer 32 is in a reverse direction with respect to the rectifier diode 42A, but in a forward direction with respect to the rectifier diode 42B. Thus, a secondary loop current Ib22 flows through the rectifier diode 42B, the secondary winding 322B, the choke coils 5L3 and 5Lc1, the output smoothing capacitor 5C, and the choke coils 5Lc2 and 5L4 in order. The secondary loop currents Ib21 and Ib22 flow, so that the DC output voltage Vout is supplied to the not-shown low-voltage battery, and the load 6 is driven.

Next, a function of a characteristic portion of the switching power supply unit 1 of the embodiment is described in detail with reference to FIG. 5.

Figure 5:
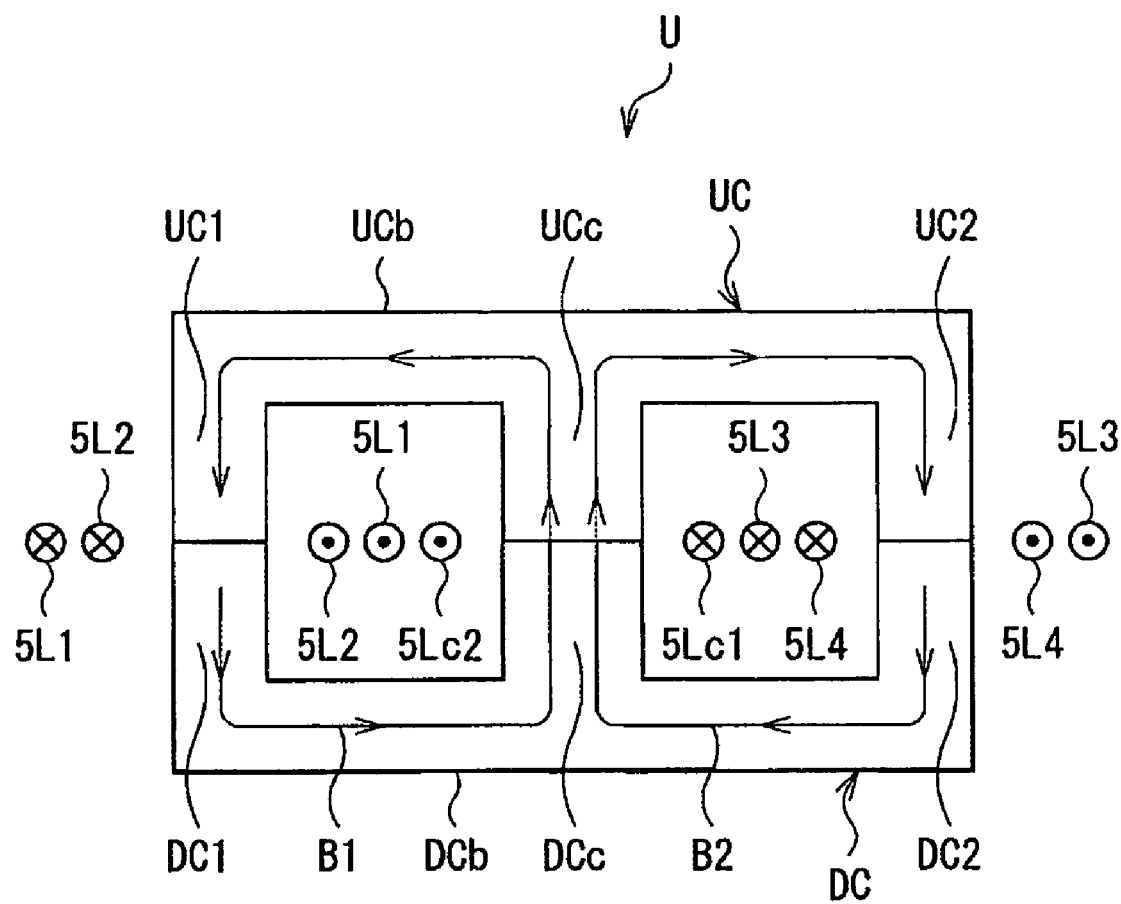
FIG. 5 shows a section view for illustrating directions of currents and magnetic fluxes in a core member shown in FIG. 2 respectively.

In the switching power supply unit 1, in the smoothing circuit 5 having a configuration as shown in FIGS. 1 and 2, when a current (the secondary loop current Ia21, Ia22, Ib21 and Ib22) flows through the respective choke coils 5L1 to 5L4, 5Lc1 and 5Lc2, and through the output smoothing capacitor 5C, magnetic paths as shown in FIG. 5 are formed in the core member U. That is, in the smoothing circuit 5, the choke coils 5L1 to 5L4 and the choke coils 5Lc1 and 5Lc2 are appropriately wound on the first magnetic cores UC1 and DC1, the second magnetic cores UC2 and DC2, and the common magnetic cores UCc and DCc respectively as shown in FIG. 2, thereby a current passing through the choke coil 5L1 and a current passing through the choke coil 5L2 form a first circular magnetic path B1 passing through the inside of the respective first magnetic cores UC1 and DC1 and the inside of the respective common magnetic cores UCc and DCc. In addition, current flows through the choke coils 5L3 and 5L4 in synchronization with the current passing through the choke coil 5L1 and the current passing through the choke coil 5L2, and the current passing through the choke coil 5L3 and the current passing through the choke coil 5L4 form a second circular magnetic path B2 passing through the inside of the respective second magnetic cores UC2 and DC2 and the inside of the respective common magnetic cores UCc and DCc. A magnetic flux in the first circular magnetic path B1 and a magnetic flux in the second circular magnetic path B2 have the same direction at a portion of each of the common magnetic cores UCc and DCc.

In this way, in the smoothing circuit 5 of the embodiment, the magnetic flux in the first circular magnetic path B1, the magnetic flux in the second circular magnetic path B2, a magnetic flux induced by the current flowing through the choke coil 5Lc1, and a magnetic flux induced by the current flowing through the choke coil 5Lc2 are the same in direction, and shared by one another in the inside of the respective common magnetic cores UCc and DCc. Thus, a current flowing through the choke coils 5L1 and 5L3, and a current flowing through the choke coils 5L2 and 5L4 are balanced, and thus stabilized.

Moreover, since such a balanced state is automatically kept in the smoothing circuit 5, a characteristic value of an element or the like need not be adjusted.

As hereinbefore, in the embodiment, in the smoothing circuit 5, the magnetic flux in the first circular magnetic path B1, the magnetic flux in the second circular magnetic path B2, the magnetic flux induced by the current flowing through the choke coil 5Lc1, and the magnetic flux induced by the current flowing through the choke coil 5Lc2 are the same in direction, and shared by one another in the inside of the respective common magnetic cores UCc and DCc. Therefore, the current flowing through the choke coils 5L1 and 5L3, and the current flowing through the choke coils 5L2 and 5L4 can be balanced, and thus stabilized. Moreover, since such a balanced state is automatically kept in the smoothing circuit 5, a characteristic value of an element or the like need not be adjusted, and consequently the characteristic value of the element need not have a large allowance. Accordingly, stable output can be supplied while manufacturing cost is held down.

Moreover, one end of the choke coil 5L1 is connected to the connection point P1 (center tap) via the terminal TL1, one end of the choke coil 5L2 is connected to the connection point P2 via the terminal TL2, one end of the choke coil 5L3 is connected to the connection point P3 (center tap) via the terminal TL3, and one end of the choke coil 5L4 is connected to the connection point P4 via the terminal TL4, and consequently, the above advantage can be obtained.

Moreover, the core member U is configured of the E-E core having the two circular magnetic paths B1 and B2 via the common magnetic cores UCc and DCc, and windings are wound on the first magnetic cores UC1 and DC1 and the second magnetic cores UC2 and DC2 outside the common magnetic cores UCc and DCc. Therefore, area in which a core overlaps with a winding can be decreased compared with a case where a winding is wound only on the common magnetic cores UCc and DCc, consequently heat radiation area of the choke coils 5L1 to 5L4, 5Lc1 and 5Lc2 can be increased. Accordingly, since heat radiation characteristics are improved, stable operation of the choke coils 5L1 to 5L4, 5Lc1 and 5Lc2 can be achieved.

Hereinafter, several modifications of an embodiment of the invention are described. The same components as in the first embodiment are marked with the same references, and description of them is appropriately omitted.

[Modification 1]

Figure 6:
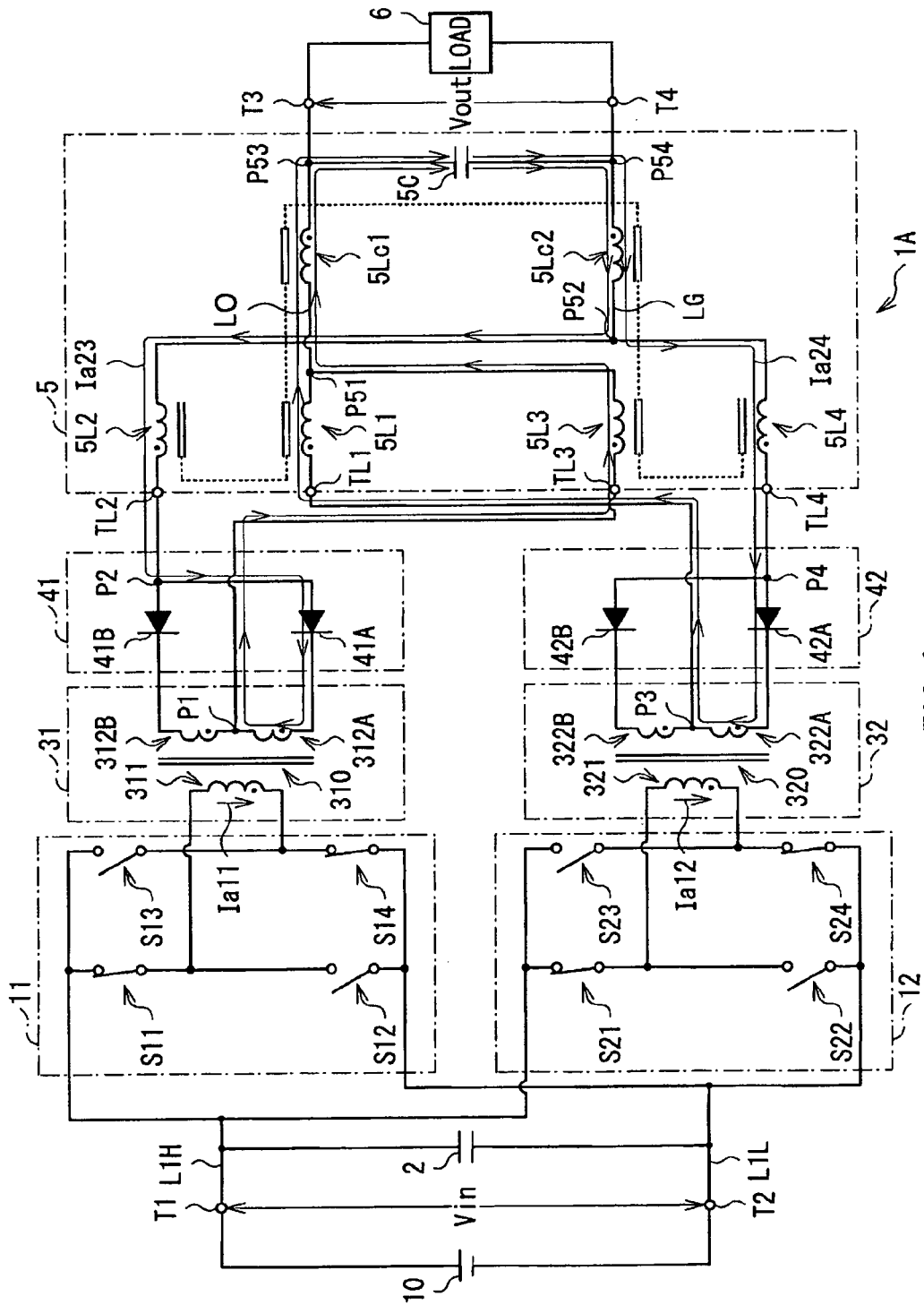
FIG. 6 shows a circuit diagram showing a configuration and basic operation of a switching power supply unit according to modification 1 of an embodiment of the invention.
Figure 7:
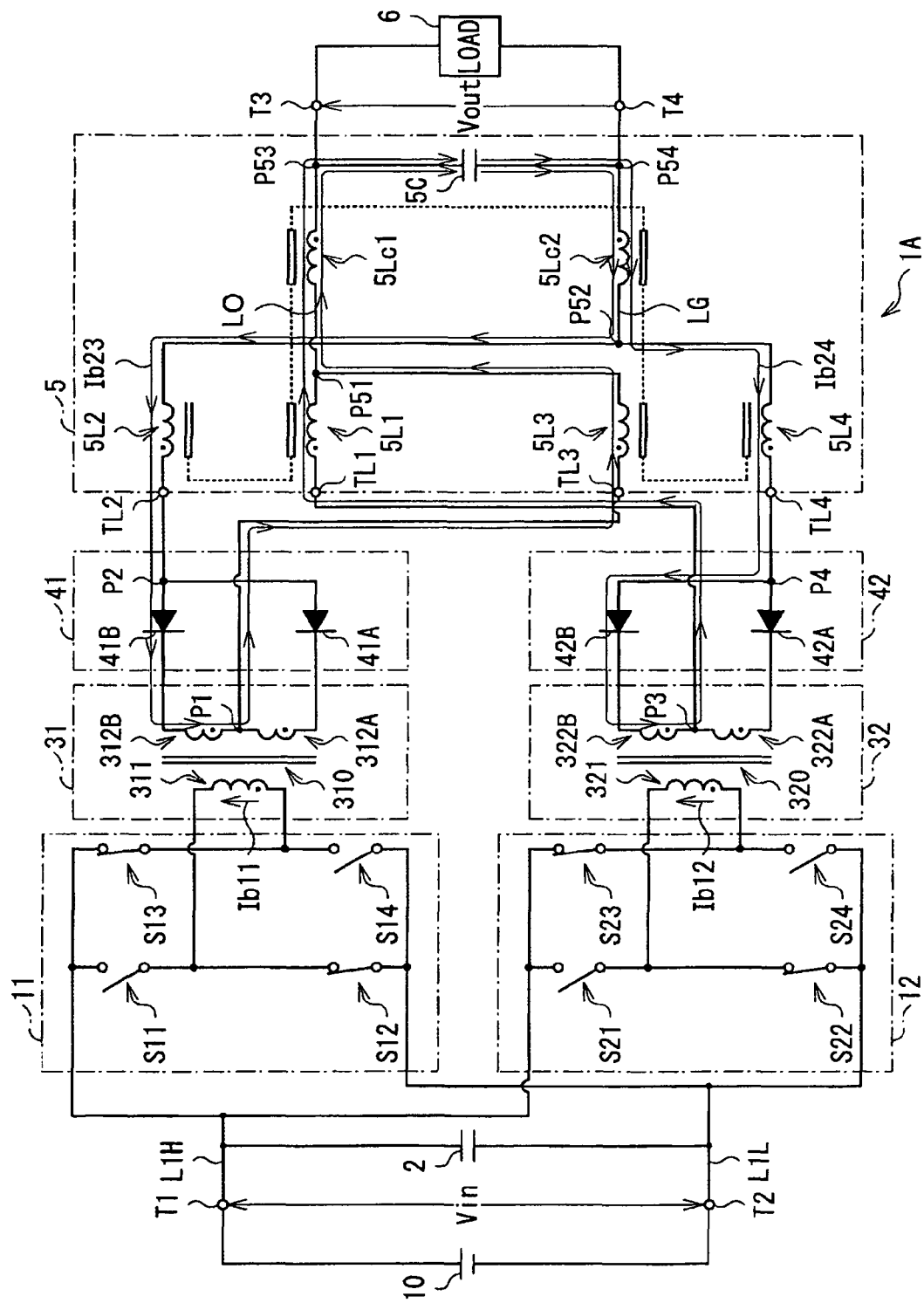
FIG. 7 shows a circuit diagram showing the configuration and the basic operation of the switching power supply unit according to the modification 1 of an embodiment of the invention.

FIGS. 6 and 7 show a circuit configuration of a switching power supply unit (switching power supply unit 1A) according to modification 1 respectively. The switching power supply unit 1A is a modification of the switching power supply unit 1 described in the embodiment, in which a connection relationship between the rectifier circuits 41 and 42 and the smoothing circuit 5 is modified. Specifically, one end of the choke coil 5L1 is connected to the connection point P3 (center tap) via the terminal TL1, one end of the choke coil 5L2 is connected to the connection point P2 via the terminal TL2, one end of the choke coil 5L3 is connected to the connection point P1 (center tap) via the terminal TL3, and one end of the choke coil 5L4 is connected to the connection point P4 via the terminal TL4. That is, the switching power supply unit 1A is a modification of the switching power supply unit 1 described in the embodiment, in which respective connection relationships between the terminals TL1 and TL3 and the connection points P1 and P3 are changed for each other.

According to such a configuration, in the switching power supply unit 1A of the modification, secondary loop currents Ia23 and Ia24 as shown in FIG. 6 flow in secondary sides of the transformers 31 and 32 based on the primary loop currents Ia11 and Ia12 respectively. On the other hand, secondary loop currents Ib23 and Ib24 as shown in FIG. 7 flow based on the primary loop currents Ia11 and Ia12 respectively.

In this way, even in the modification, in the smoothing circuit 5, a magnetic flux in the first circular magnetic path B1, a magnetic flux in the second circular magnetic path B2, a magnetic flux induced by the current flowing through the choke coil 5Lc1, and a magnetic flux induced by the current flowing through the choke coil 5Lc2 are shared by one another in the inside of the respective common magnetic cores UCc and DCc. Consequently, stable output can be supplied while manufacturing cost is held down.

[Modification 2]

Figure 8:
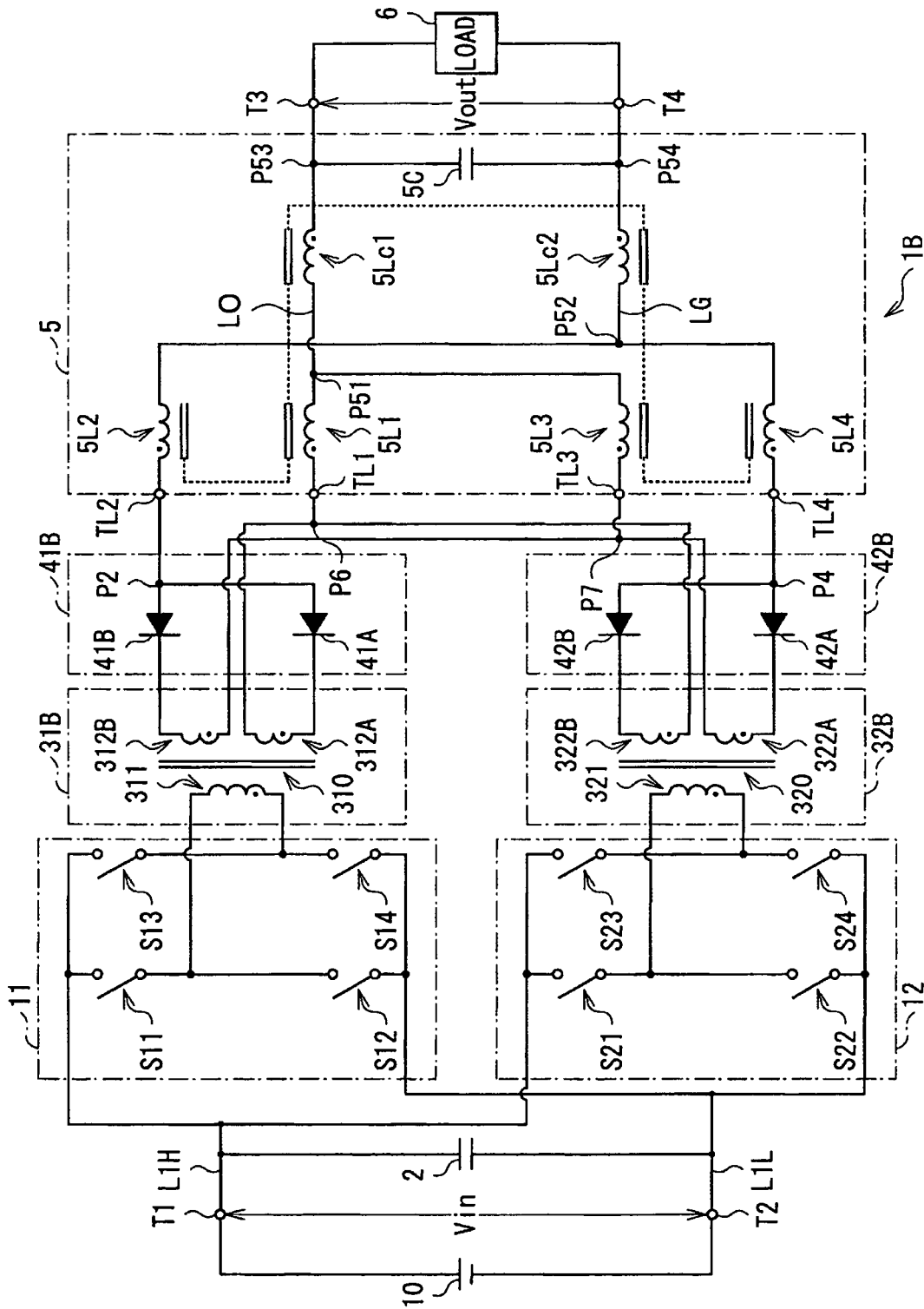
FIG. 8 shows a circuit diagram showing a configuration and basic operation of a switching power supply unit according to modification 2 of an embodiment of the invention.

FIG. 8 shows a circuit configuration of a switching power supply unit (switching power supply unit 1B) according to modification 2. The switching power supply unit 1B is a modification of the switching power supply unit 1 described in the embodiment, in which transformers 31B and 32B have a pair of secondary windings 312A and 312B, and a pair of secondary windings 322A and 322B respectively, and the unit 1B includes a rectifier circuit connected to one secondary winding 312A of the transformer 31B, and to the other secondary winding 322B of the transformer 32B, and a rectifier circuit connected to the other secondary winding 312B of the transformer 31B, and to one secondary winding 322A of the transformer 32B. One end of the choke coil 5L1 is connected to the connection point P6 via the terminal TL1, one end of the choke coil 5L2 is connected to the connection point P2 via the terminal TL2, one end of the choke coil 5L3 is connected to the connection point P7 via the terminal TL3, and one end of the choke coil 5L4 is connected to the connection point P4 via the terminal TL4.

The transformer 31B corresponds to a specific example of "first transformer" of an embodiment of the invention, and the transformer 32B corresponds to a specific example of "second transformer" of an embodiment of the invention. The connection point P6 corresponds to a specific example of "current outlet of the first rectifier circuit" of an embodiment of the invention, and the connection point P7 corresponds to a specific example of "current outlet of the second rectifier circuit" of an embodiment of the invention.

According to such a configuration, even in the modification, in the smoothing circuit 5, a magnetic flux in the first circular magnetic path B1, a magnetic flux in the second circular magnetic path B2, a magnetic flux induced by a current flowing through the choke coil 5Lc1, and a magnetic flux induced by a current flowing through the choke coil 5Lc2 are shared by one another in the inside of the respective common magnetic cores UCc and DCc. Consequently, stable output can be supplied while manufacturing cost is held down.

[Modification 3]

Figure 9:
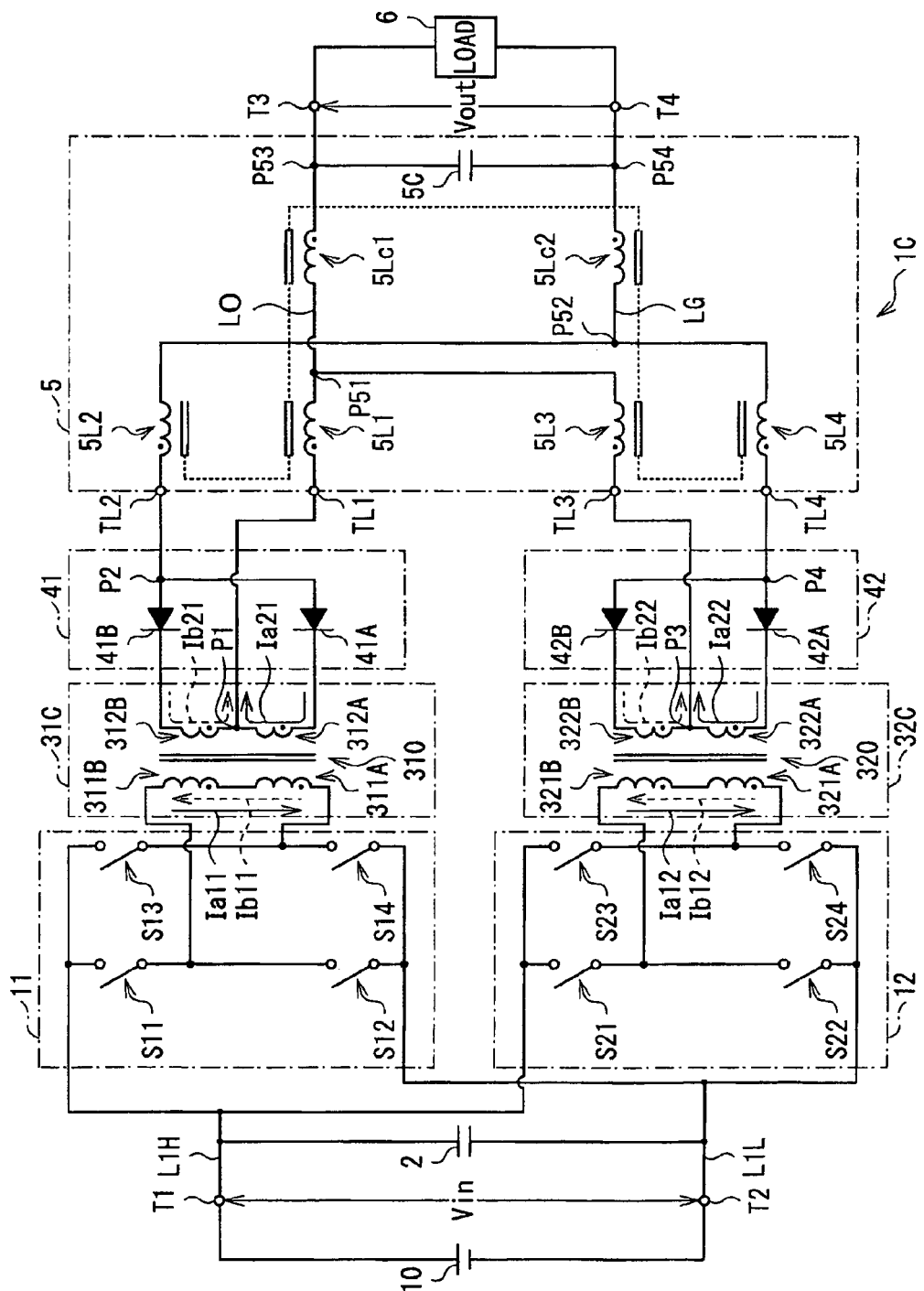
FIG. 9 shows a circuit diagram showing a configuration and basic operation of a switching power supply unit according to modification 3 of an embodiment of the invention.

FIG. 9 shows a circuit configuration of a switching power supply unit (switching power supply unit 1C) according to modification 3. In the switching power supply unit 1C, transformers 31C and 32C are connected in series, and have a pair of primary windings 311A and 311B and a pair of primary windings 321A and 321B respectively, in which AC resistance alternately becomes higher between each winding pair during switching operation of the inverter circuits 11 and 12.

According to such a configuration, in the switching power supply unit 1C of the modification, as shown in the figure, when electric currents flow through respective primary windings 311A and 311B and 321A and 321B of the transformers 31C and 32C, and through respective secondary windings 312A and 312B and 322A and 322B of the transformers in opposite directions between the primary and secondary windings, AC resistance is reduced due to a skin effect and a proximity effect. Specifically, when primary loop currents Ia11 and Ia12 flow through the primary windings 311A and 311B and the primary windings 321A and 321B respectively, in the primary windings 311A and 321A disposed near the secondary windings 312A and 322A through which secondary loop currents Ia21 and Ia22 flow, the primary loop currents Ia11 and Ia12 and the secondary loop currents Ia21 and Ia22 are opposite in direction to each other. Therefore, in the primary windings 311A and 321A, AC resistance is reduced due to the skin effect and the proximity effect compared with a case where windings having the same current direction are close to each other. When primary loop currents Ib11 and Ib12 flow through the primary windings 311A and 311B and the primary windings 321A and 321B respectively, in the primary windings 311B and 321B disposed near the secondary windings 312B and 322B through which secondary loop currents Ib21 and Ib22 flow, the primary loop currents Ib11 and Ib12 and the secondary loop currents Ib21 and Ib22 are opposite in direction to each other. Therefore, in the primary windings 311B and 321B, AC resistance is reduced due to the skin effect and the proximity effect compared with a case where windings having the same current direction are close to each other. According to these, since an oscillating component is absorbed by the primary windings having relatively high AC resistance, ringing of output can be suppressed.

As hereinbefore, in the modification, the advantage as in the embodiment is obtained, in addition, ringing of output can be suppressed, and consequently output can be further stabilized.

[Modification 4]

Figure 10:
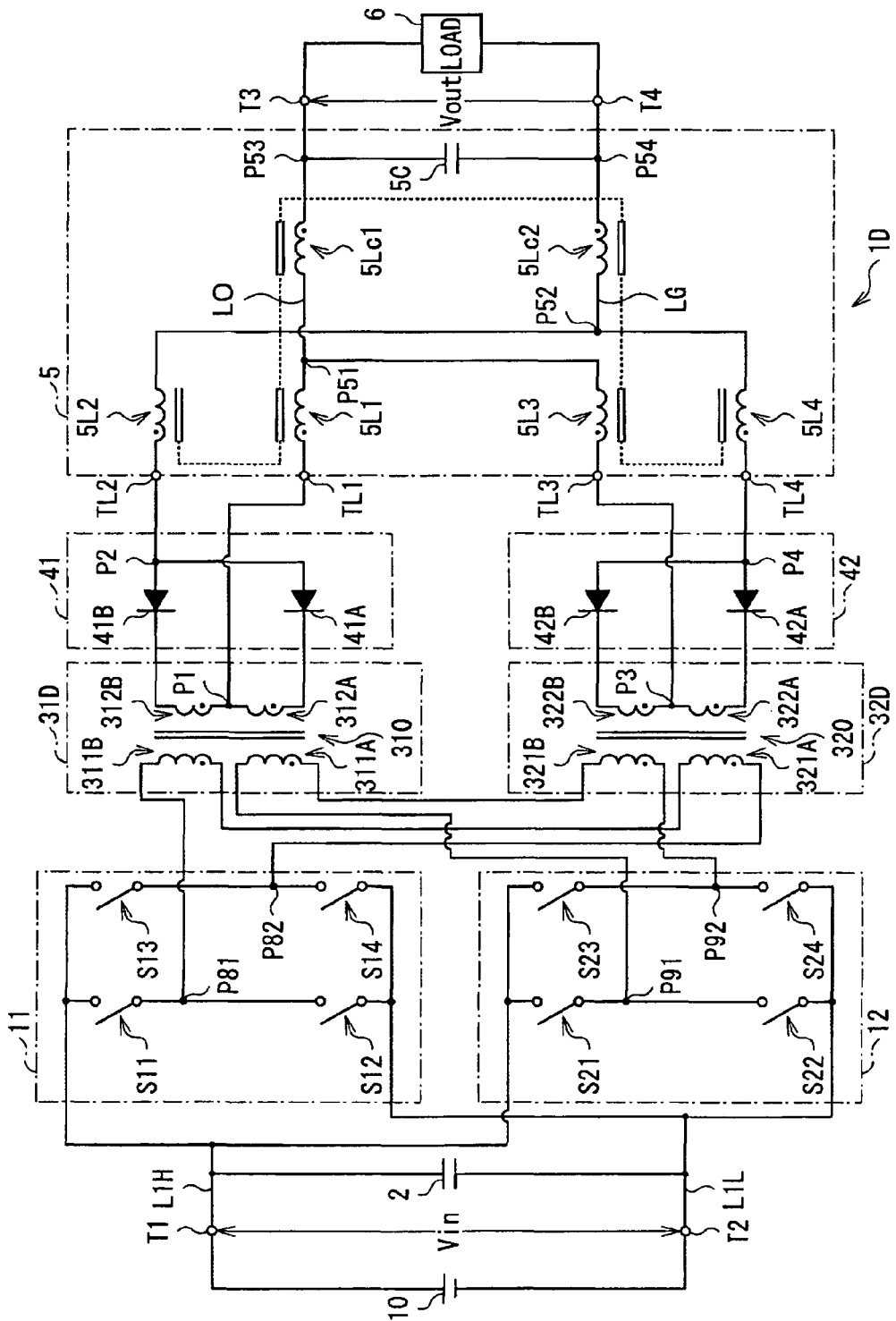
FIG. 10 shows a circuit diagram showing a configuration and basic operation of a switching power supply unit according to modification 4 of an embodiment of the invention.

FIG. 10 shows a circuit configuration of a switching power supply unit (switching power supply unit 1D) according to modification 4. The switching power supply unit 1D is a further modification of the switching power supply unit 1C described in the modification 3, in which connection relationships between the inverter circuits 11 and 12 and respective pairs of primary windings 311A and 311B and 321A and 321B of transformers 31D and 32D are changed for each other.

According to such a configuration, even in the modification, in the smoothing circuit 5, a magnetic flux in the first circular magnetic path B1, a magnetic flux in the second circular magnetic path B2, a magnetic flux induced by a current flowing through the choke coil 5Lc1, and a magnetic flux induced by a current flowing through the choke coil 5Lc2 are shared by one another in the inside of the respective common magnetic cores UCc and DCc. Consequently, stable output can be supplied while manufacturing cost is held down.

[Modification 5]

Figure 11:
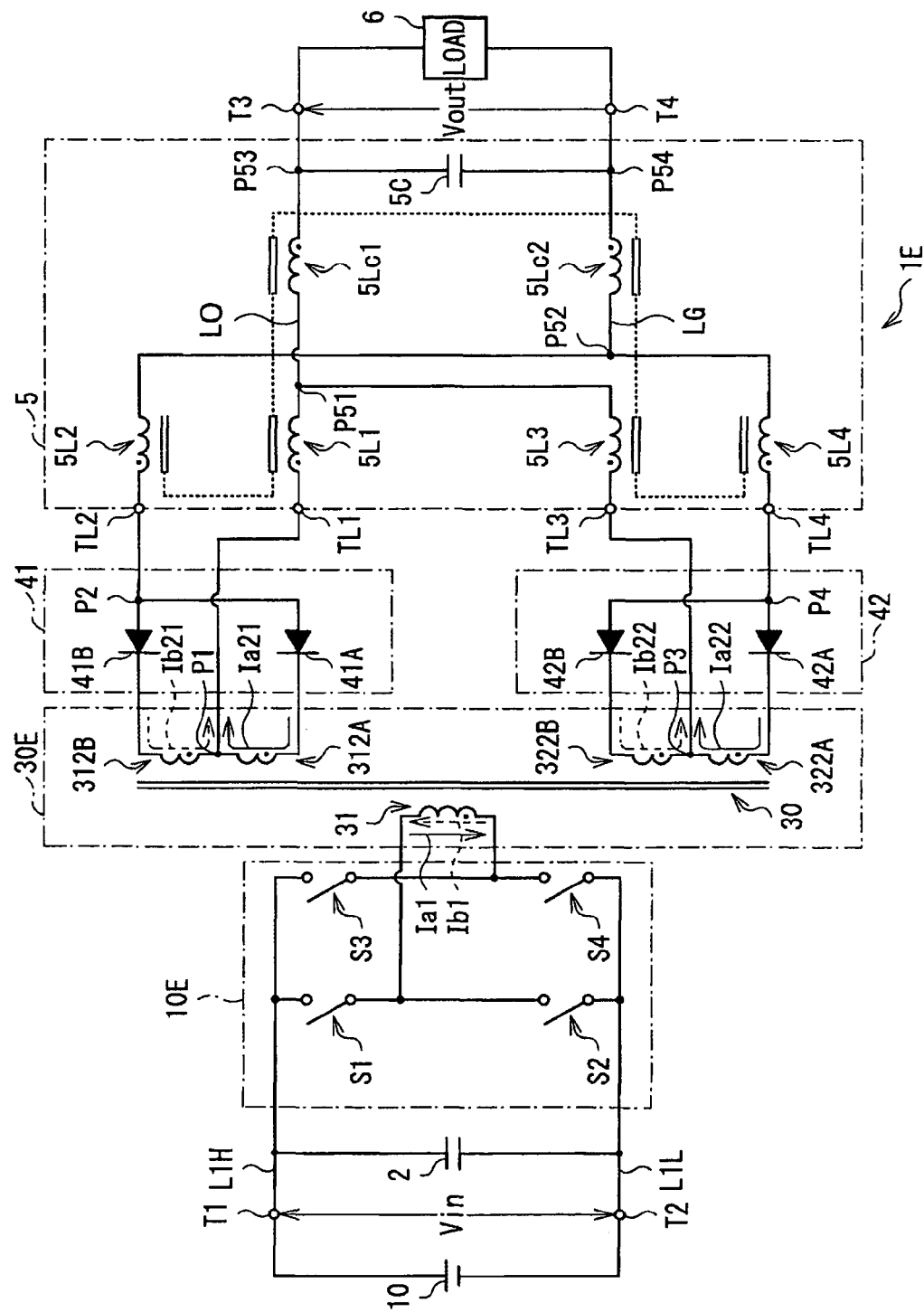
FIG. 11 shows a circuit diagram showing a configuration and basic operation of a switching power supply unit according to modification 5 of an embodiment of the invention.

FIG. 11 shows a circuit configuration of a switching power supply unit (switching power supply unit 1E) according to modification 5. The switching power supply unit 1E is a modification of the switching power supply unit 1 described in the embodiment, in which the inverter circuits disposed at the primary sides of transformers 31 and 32 are configured of a single inverter circuit 10E.

According to such a configuration, even in the modification, in the smoothing circuit 5, a magnetic flux in the first circular magnetic path B1, a magnetic flux in the second circular magnetic path B2, a magnetic flux induced by a current flowing through the choke coil 5Lc1, and a magnetic flux induced by a current flowing through the choke coil 5Lc2 are shared by one another in the inside of the respective common magnetic cores UCc and DCc. Consequently, stable output can be supplied while manufacturing cost is held down.

Moreover, compared with a case where the inverter circuits are configured of a plurality of inverter circuits 11 and 12 as in the embodiment, a circuit configuration is simplified, in addition, manufacturing cost can be further reduced.

[Modification 6]

Figure 12:
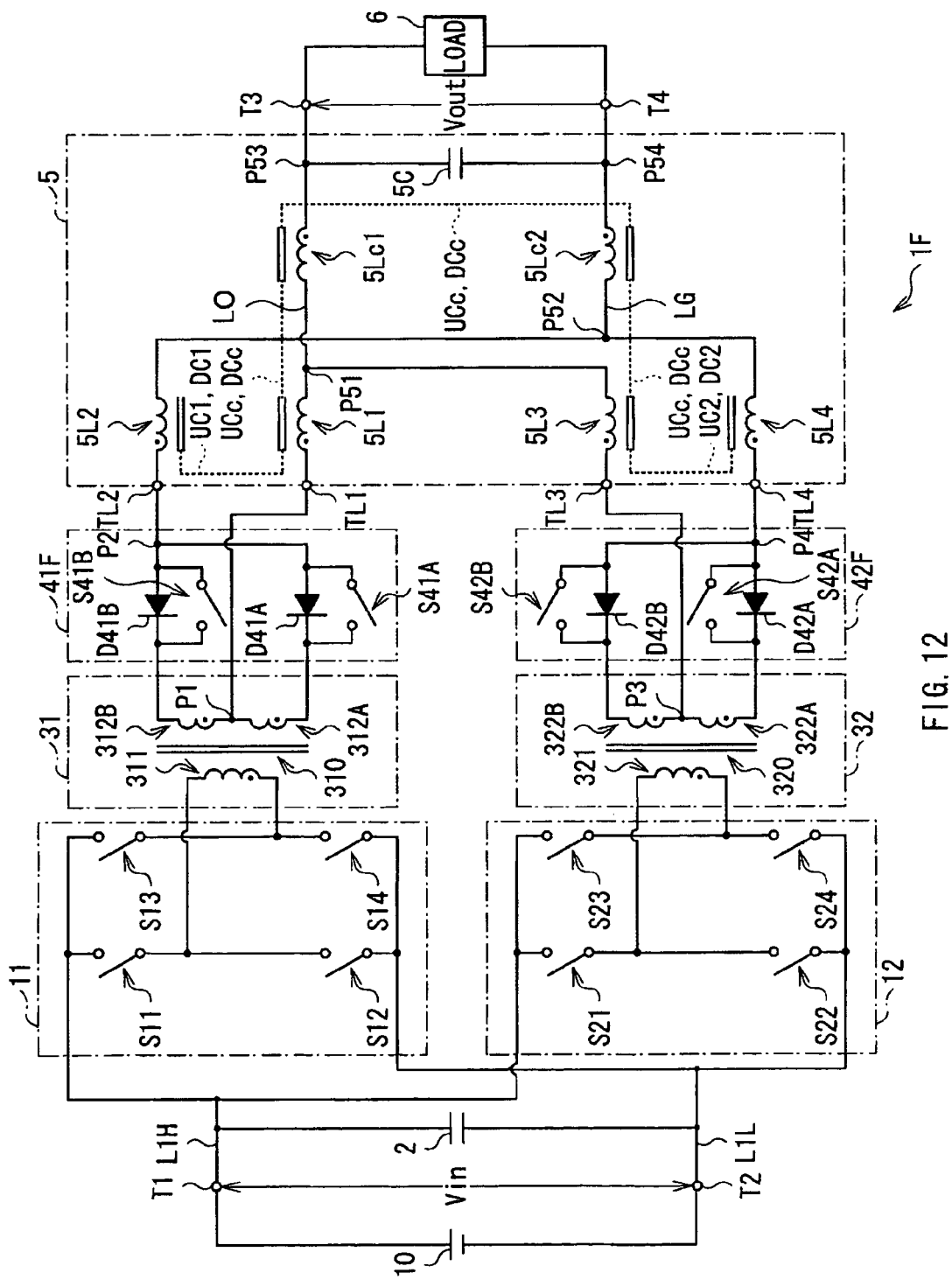
FIG. 12 shows a circuit diagram showing a configuration of a switching power supply unit according to modification 6 of an embodiment of the invention.

FIG. 12 shows a circuit configuration of a switching power supply unit (switching power supply unit 1F) according to modification 6. The switching power supply unit 1F is a modification of the switching power supply unit 1 described in the embodiment, in which rectifier circuits (switching circuits) 41F and 42F are provided in place of the rectifier circuits 41 and 42.

In the rectifier circuits 41F and 42F, FET (Field Effect Transistor) is used as a rectifier element. That is, while previous description was made with the rectifier diode as an example of the rectifier element, the modification uses FET as the rectifier element. Thus, the rectifier diode elements 41A, 41B, 42A and 42B in the embodiment may be configured of switching elements S41A, S41B, S42A and S42B, and rectifier diodes D41A, D41B, D42A and D42B (parasitic diodes of the switching elements S41A, S41B, S42A and S42B) connected in parallel to the switching elements.

According to such a configuration, in the modification, the rectifier circuits 41F and 42F perform synchronous rectification operation, thereby circuit efficiency can be improved compared with the embodiment.

[Modification 7]

Figure 13:
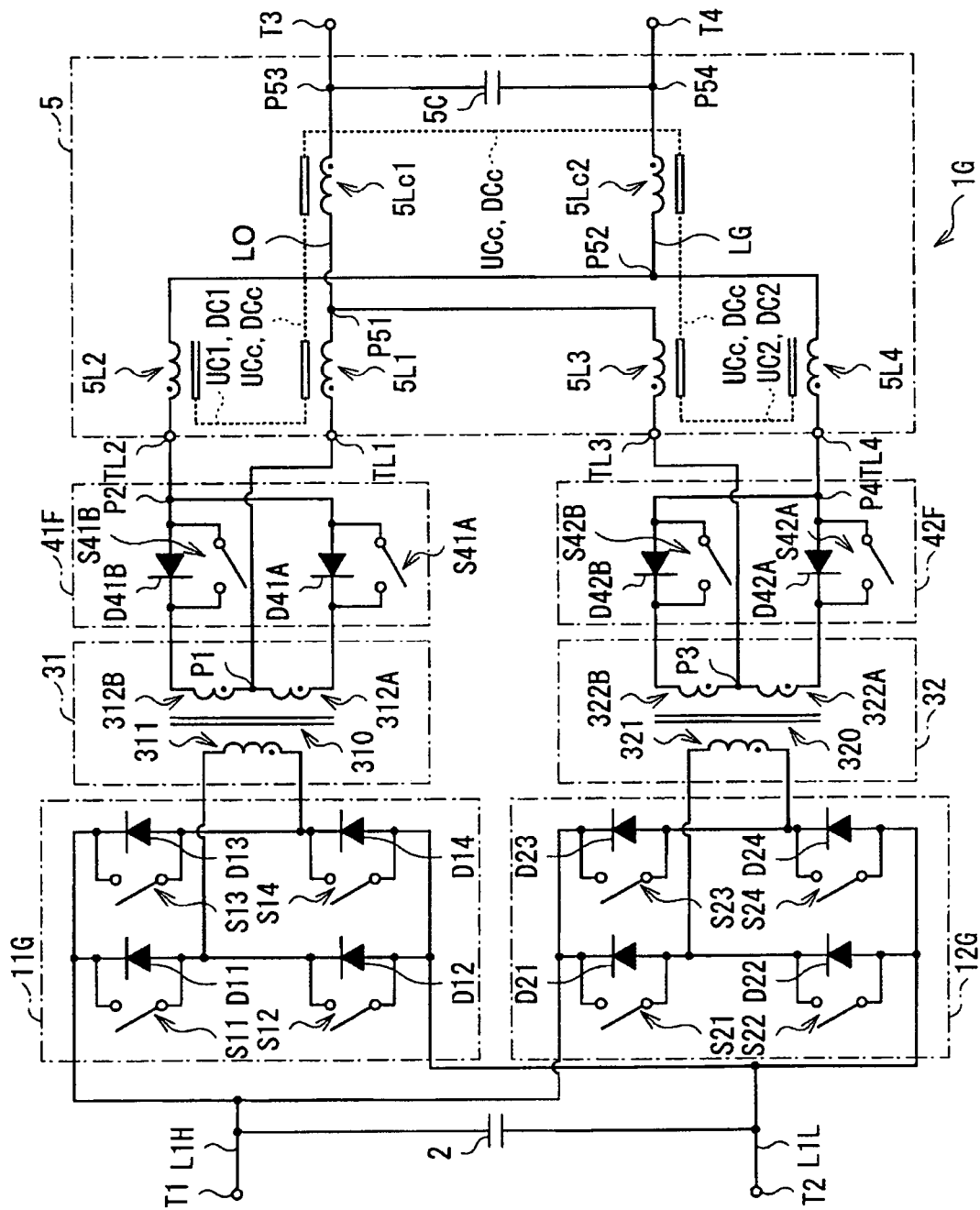
FIG. 13 shows a circuit diagram showing a configuration of a switching power supply unit according to modification 7 of an embodiment of the invention.

FIG. 13 shows a circuit configuration of a switching power supply unit (switching power supply unit 1G) according to modification 7. The switching power supply unit 1G is a modification of the switching power supply unit 1 described in the embodiment, in which the switching circuits 41F and 42F described in the modification 7 are provided in place of the rectifier circuits 41 and 42, and switching circuits 11G and 12G are provided in place of the inverter circuits 11 and 12.

In the switching circuits 11G and 12G, the switching elements S11 to S14 in the embodiment are configured of MOSFETs and the like. Thus, in the switching circuits 11G and 12G, the switching elements S11 to S14 can be regarded to include the switching elements S11 to S14, and rectifier diodes D11 to D14 (parasitic diodes of the switching elements S11 to S14) connected in parallel to the switching elements.

According to such a configuration, in the modification, step-down operation as described in the embodiment can be performed, in which a DC input voltage Vin inputted from the input terminals T1 and T2 is stepped down, and a DC output voltage Vout is outputted from the output terminals T3 and T4, in addition, step-up operation as described below can be performed, in which a DC input voltage Vin inputted from the output terminals T3 and T4 is stepped up, and a DC output voltage Vout is outputted from the input terminals T1 and T2 (bidirectional operation can be performed). In such a case, during step-down operation (forward operation), the switching circuits 11G and 12G act as inverter circuits, and the switching circuits 41F and 42F aet as rectifier circuits, and during step-up operation (reverse operation), the switching circuits 41F and 42F act as inverter circuits, and the switching circuits 11G and 12G act as rectifier circuits.

The input terminals T1 and T2 correspond to a specific example of "first input/output terminal" of an embodiment of the invention, and the output terminals T3 and T4 correspond to a specific example of "second input/output terminal" of an embodiment of the invention. The switching circuits 11G and 12G correspond to a specific example of "first circuits" of an embodiment of the invention, and the switching circuits 41F and 42F correspond to a specific example of "two second circuits" of an embodiment of the invention. The switching elements S11 to S14 and S21 to S24 correspond to a specific example of "first switching elements" of an embodiment of the invention, and the rectifier diodes D11 to D14 and D21 to D24 correspond to a specific example of "first rectifier elements" of an embodiment of the invention. The switching elements S41A, S41B, S42A and S42B correspond to a specific example of "second switching elements" of an embodiment of the invention, and the rectifier diodes D41A, D41B, D42A and D42B correspond to a specific example of "second rectifier elements" of an embodiment of the invention.

During the step-up operation (reverse operation), a drive signal to each of the switching elements S11 to S14 and S21 to S24 is continuously at 0 V, and therefore each of the switching elements S11 to S14 and S21 to S24 is continuously off. However, when the synchronous rectification is performed, the switching elements S11 to S14 and S21 to S24 also perform on/off operation, consequently loss is reduced compared with the case of using the rectifier diodes. The following description using FIGS. 14 to 16 shows a case that the switching elements S11 to S14 and S21 to S24 perform such synchronous rectification.

Figure 14:
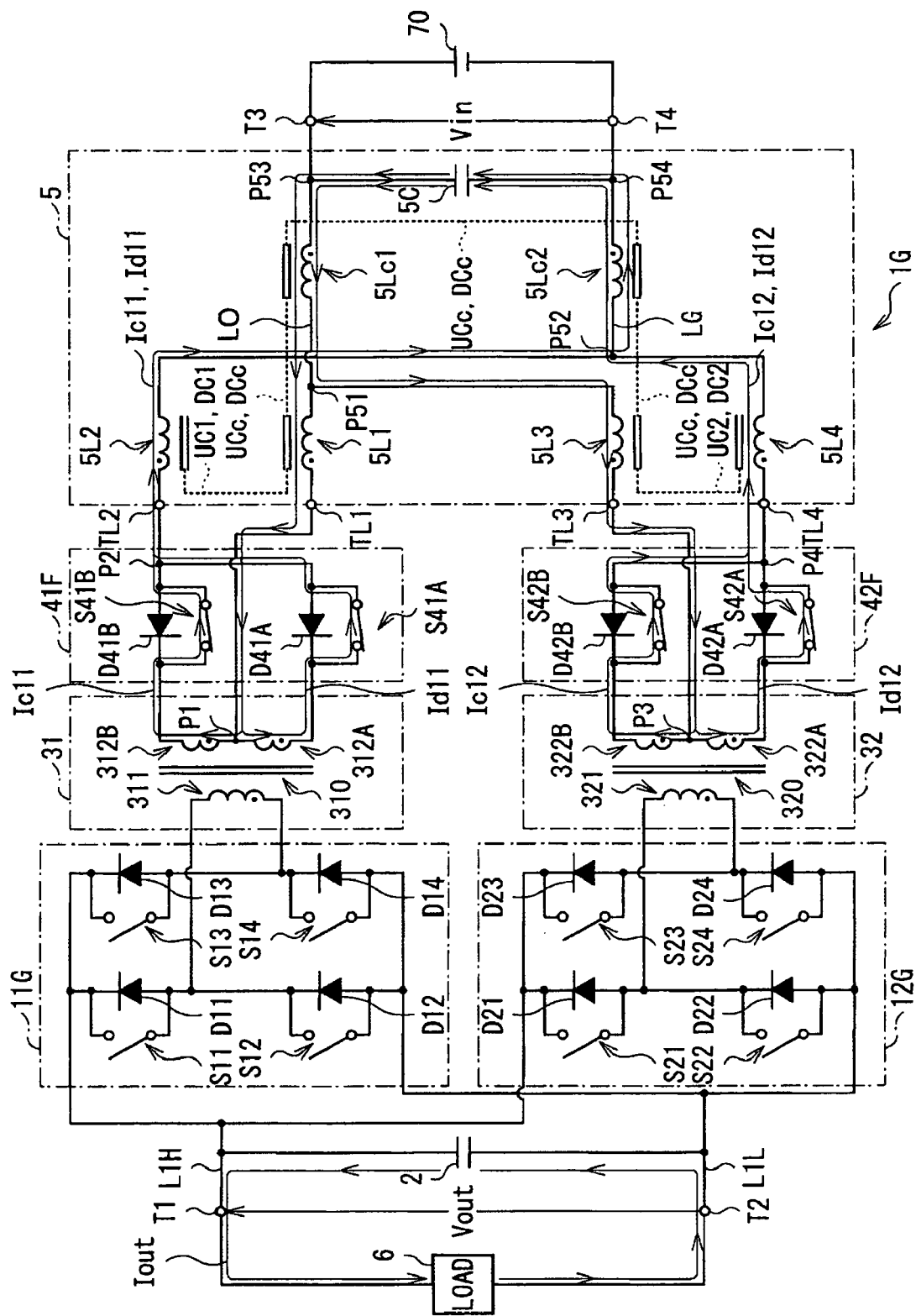
FIG. 14 shows a circuit diagram for illustrating operation of the switching power supply unit shown in FIG. 13.

First, as shown in FIG. 14, both of the switching elements S41A and S42A and the switching elements S41B and S42B are turned on. Therefore, at a low-voltage side including the switching circuits 41F and 42F, loop currents Ic11, Ic12, Id11 and Id12 flow from a low-voltage battery 70 as shown in the figure, so that the choke coils 5L1 to 5L4, 5Lc1 and 5Lc2 are excited. Since windings 312A and 312B of the transformer 31, or windings 322A and 322B of the transformer 32 are opposite in winding direction, and equal in number of turns respectively, magnetic fluxes generated by currents flowing through the windings 312A and 312B, or magnetic fluxes generated by currents flowing through the windings 322A and 322B are canceled by each other, and thus a voltage is 0 V across the windings 312A and 312B, and across the windings 322A and 322B. Accordingly, in this period, power transmission is not performed from a low voltage side to a high voltage side. However, on the high voltage side, an output current Iout flows from an input smoothing capacitor 2 to a load 6 as shown in the figure.

Figure 15:
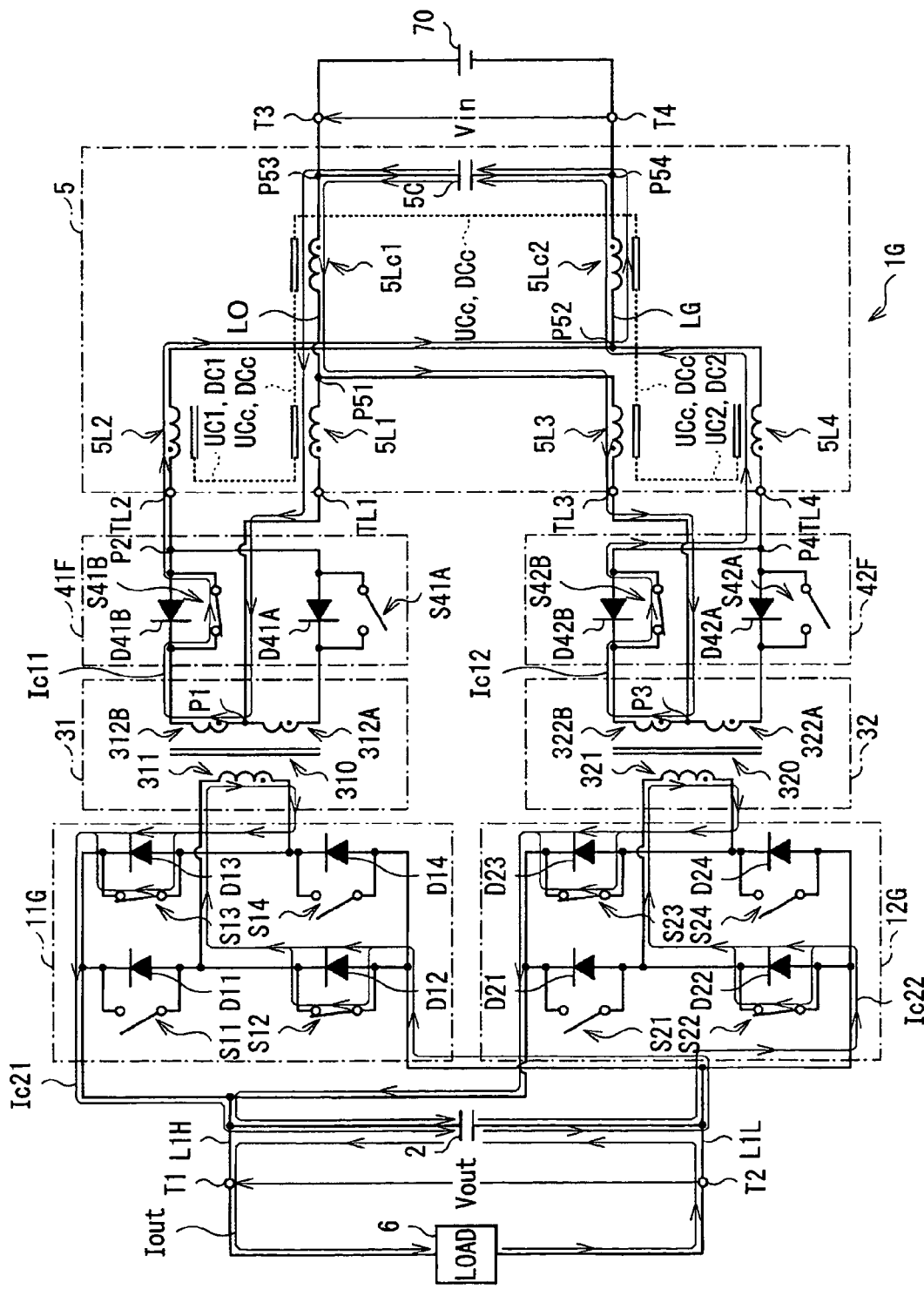
FIG. 15 shows a circuit diagram for illustrating the operation of the switching power supply unit shown in FIG. 13.

Next, only the switching elements S41A and S42A are turned off as shown in FIG. 15. Accordingly, only the loop currents Ic11 and Ic12 flow on the low voltage side as shown in the figure, and power transmission is performed from the low voltage side to the high voltage side based on energy stored in the choke coils 5L1 to 5L4, 5Lc1 and 5Lc2. At that time, in a switching circuit 11G, the switching elements S12 and S13 are on, and the switching elements S11 and S14 are off, showing a fact that synchronous rectification operation is performed. Similarly, in a switching circuit 12G, the switching elements S22 and S23 are on, and the switching elements S21 and S24 are off, showing a fact that synchronous rectification operation is performed. After a period of an operation state as shown in FIG. 15, the switching circuits returns into an operation state as shown in FIG. 14.

Figure 16:
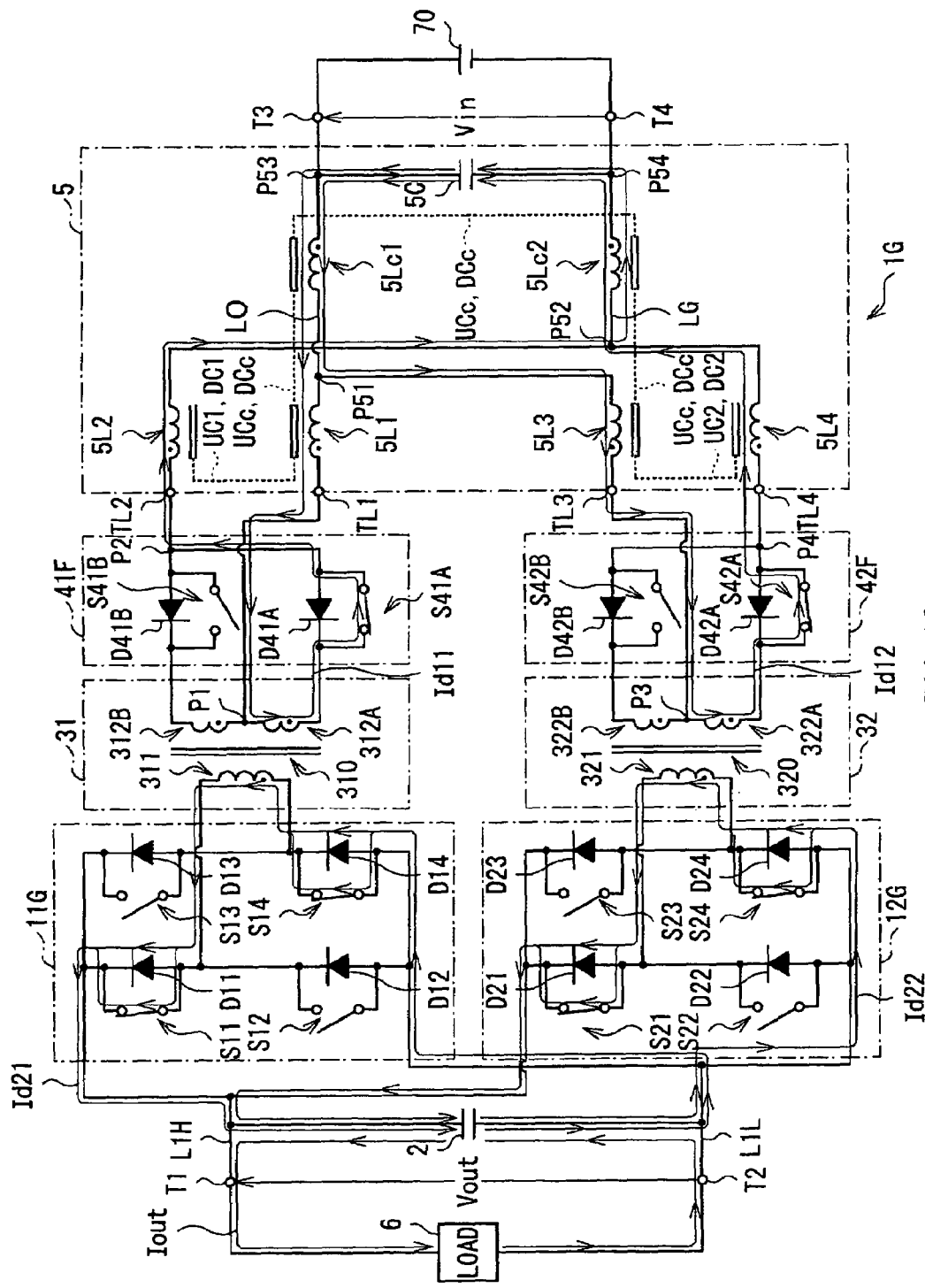
FIG. 16 shows a circuit diagram for illustrating the operation of the switching power supply unit shown in FIG. 13.

After a period of such an operation state as shown in FIG. 14 is newly finished, only the switching elements S41B and S42B are turned off as shown in FIG. 16. Accordingly, only the loop currents Id11 and Id12 flow on the low voltage side as shown in the figure, and power transmission is performed from the low voltage side to the high voltage side based on energy stored in the choke coils 5L1 to 5L4, 5Lc1 and 5Lc2. At that time, in the switching circuit 11G, the switching elements S11 and S14 are on, and the switching elements S12 and S13 are off, showing a fact that synchronous rectification operation is performed. Similarly, in the switching circuit 12G, the switching elements S21 and S24 are on, and the switching elements S22 and S23 are off, showing a fact that synchronous rectification operation is performed.

Hereinbefore, the invention was described with the embodiment and the modifications thereof. However, the invention is not limited to the embodiments and the like, and can be variously altered or modified.

For example, respective currents flowing through the choke coil 5L1 and through the choke coil 5L2, and respective currents flowing through the choke coil 5L3 and through the choke coil 5L4 are not limited to be literally perfectly synchronized as described in the embodiment, and can be substantially synchronized. Moreover, the respective currents flowing through the choke coil 5L1 and through the choke coil 5L2, or the respective currents flowing through the choke coil 5L3 and through the choke coil 5L4 need not flow perfectly simultaneously, and can be flow substantially simultaneously.

In the embodiment and the like, description was made on the case that the core member U was configured of the E-E core. However, the core member may be configured of an E-I core or the like.

A configuration of the inverter circuit may be a configuration other than the full bridge type (for example, half bridge type).

A configuration of the rectifier circuit may be in a type of cathode common connection rather than anode common connection, or may be configured to be in a type other than the center tap type (for example, a bridge type or a forward type). Moreover, a rectifier circuit of a half-wave rectification type may be used instead of the rectifier circuit of the full-wave rectification type.

Furthermore, the modifications described concerning the embodiment may be combined with one another.

It should be understood by those skilled in the art that various modifications, combinations, sub-combinations and alterations may occur depending on design requirements and other factors insofar as they are within the scope of the appended claims or the equivalent thereof.

What is claimed is:

1. A switching power supply unit, comprising:
an inverter switching a DC input voltage to generate an AC voltage,
one or more transformers, each having a primary winding on a side of the inverter and secondary windings, and transforming the AC voltage and outputting an AC output voltage,
a pair of rectifier circuits each connected to secondary sides of each of the transformers, each of the rectifier circuits rectifying the AC output voltage, and
a smoothing circuit smoothing output voltages from the pair of rectifier circuits so as to generate a DC output voltage,
the smoothing circuit including:
a capacitance element,
first and second magnetic cores,
a common magnetic core disposed between the first and second magnetic cores,
first and second windings, each winding being connected to one of the rectifier circuits at one end, and wound on the first magnetic core,
third and fourth windings, each winding being connected to one of the rectifier circuits at one end, and wound on the second magnetic core,
a first common winding connecting between one end of the capacitance element and a connection point of the other ends of the first and third windings, and wound on the common magnetic core, and
a second common winding connecting between the other end of the capacitance element and a connection point of the other ends of the second and fourth windings, and wound on the common magnetic core, wherein
a current through the first winding and a current through the second winding generate a first circular magnetic path passing through the inside of the first magnetic core and the common magnetic core,
a current through the third winding and a current through the fourth winding, which are synchronized with the current through the first winding and the current through the second winding, generate a second circular magnetic path passing through the inside of the second magnetic core and the common magnetic core, and
the common magnetic core is shared by a magnetic flux in the first circular magnetic path, a magnetic flux in the second circular magnetic path, a magnetic flux generated by the current through the first common winding, and a magnetic flux generated by the current through the second common winding.

2. The switching power supply unit according to claim 1:
wherein
the pair of rectifier circuits include first and second rectifier circuits each having a current inlet and a current outlet,
one end of the first winding is connected to the current outlet of the first rectifier circuit,
one end of the second winding is connected to the current inlet of the first rectifier circuit,
one end of the third winding is connected to the current outlet of the second rectifier circuit, and
one end of the fourth winding is connected to the current inlet of the second rectifier circuit.

3. The switching power supply unit according to claim 1:
wherein
the pair of rectifier circuits include first and second rectifier circuits each having a current inlet and a current outlet,
one end of the first winding is connected to the current outlet of the second rectifier circuit,
one end of the second winding is connected to the current inlet of the first rectifier circuit,
one end of the third winding is connected to the current outlet of the first rectifier circuit, and
one end of the fourth winding is connected to the current inlet of the second rectifier circuit.

4. The switching power supply unit according to claim 1:
wherein
the transformers include first and second transformers each having a pair of secondary windings,
the pair of rectifier circuits include a first rectifier circuit and a second rectifier circuit each having a current inlet and a current outlet,
one of the pair of the secondary windings of the first transformer being connected to the first rectifier circuit while the other being connected to the second rectifier circuit, and
one of the secondary windings of the second transformer being connected to the second rectifier circuit while the other being connected to the first rectifier circuit,
one end of the first winding in the smoothing circuit is connected to the current outlet of the first rectifier circuit,
one end of the second winding in the smoothing circuit is connected to the current inlet of the first rectifier circuit,
one end of the third winding in the smoothing circuit is connected to the current outlet end of the second rectifier circuit, and
one end of the fourth winding in the smoothing circuit is connected to the current inlet of the second rectifier circuit.

5. The switching power supply unit according to claim 1:
wherein
each of the transformers has a pair of primary windings being connected in series, AC resistance of the pair of primary windings alternately changing higher in accordance with change of current direction during switching operation of the inverter.

6. The switching power supply unit according to claim 1:
wherein
the inverter includes a single inverter circuit.

7. A switching power supply unit converting a DC input voltage inputted from one of first and second input/output terminal pairs to a DC output voltage, and outputting the DC output voltage from the other of input/output terminal pairs, comprising:
one or more transformers, each having a first transformer winding on a side of the first input/output terminal pair and second transformer windings on a side of the second input/output terminal pair,
a first circuit disposed on a side of the first transformer winding of the transformers, the first circuit including a plurality of first switching elements and first rectifier elements, each of the first rectifier elements being connected in parallel to each of the plurality of first switching elements,
a pair of second circuits each disposed on a side of the second transformer windings of the transformers, each of the second circuits including a plurality of second switching elements and second rectifier elements, each of the second rectifier elements being connected in parallel to each of the plurality of second switching elements, and
a smoothing circuit disposed between the second input/output terminal and the pair of second circuits,
the smoothing circuit including:
a capacitance element,
first and second magnetic cores,
a common magnetic core disposed between the first and second magnetic cores,
first and second windings, each winding being connected to one of the second circuits at one end, and wound on the first magnetic core,
third and fourth windings, each winding being connected to the other of the second circuits at one end, and wound on the second magnetic core,
a first common winding connecting between one end of the capacitance element and a connection point of the other ends of the first and third windings, and wound on the common magnetic core, and
a second common winding connecting between the other end of the capacitance element and a connection point of the other ends of the second and fourth windings, and wound on the common magnetic core, wherein
a current through the first winding and a current through the second winding generate a first circular magnetic path passing through the inside of the first magnetic core and the common magnetic core,
a current through the third winding and a current through the fourth winding, which are synchronized with the current through the first winding and the current through the second winding, generate a second circular magnetic path passing through the inside of the second magnetic core and the common magnetic core, and
the common magnetic core is shared by a magnetic flux in the first circular magnetic path, a magnetic flux in the second circular magnetic path, a magnetic flux generated by the current through the first common winding, and a magnetic flux generated by the current through the second common winding.

* * * * *